United States Patent
Devine et al.

(10) Patent No.: US 6,385,644 B1
(45) Date of Patent: *May 7, 2002

(54) MULTI-THREADED WEB BASED USER INBOX FOR REPORT MANAGEMENT

(75) Inventors: Carol Y. Devine, Colorado Springs; Tammy E. Dollar, Peyton; Wayne J. Munguia, Colorado Springs, all of CO (US)

(73) Assignee: MCI WorldCom, Inc., Jackson, MS (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,512

(22) Filed: Sep. 24, 1998

Related U.S. Application Data

(60) Provisional application No. 60/060,655, filed on Sep. 26, 1997.

(51) Int. Cl.⁷ .................................... G06F 15/16
(52) U.S. Cl. ................ 709/206; 709/203; 709/217; 709/219; 709/224
(58) Field of Search ................. 709/203, 266, 709/207, 223, 224, 217, 218, 219; 379/93.01, 93.24; 707/1, 2, 4, 16, 5, 6, 101, 104; 713/201, 202; 345/335, 333, 334

(56) References Cited

U.S. PATENT DOCUMENTS

| | | | |
|---|---|---|---|
| 4,160,129 A | 7/1979 | Peyser et al. | 379/220.01 |
| 4,345,315 A | 8/1982 | Cadotte et al. | 705/10 |
| 4,817,050 A | 3/1989 | Komatsu et al. | 707/10 |
| 4,893,248 A | 1/1990 | Pitts et al. | 705/400 |
| 4,972,504 A | 11/1990 | Daniel Jr. et al. | 705/10 |
| 5,041,972 A | 8/1991 | Frost | 705/10 |
| 5,075,771 A | 12/1991 | Hashimoto | 725/46 |
| 5,131,020 A | 7/1992 | Liebesny et al. | 455/422 |

(List continued on next page.)

FOREIGN PATENT DOCUMENTS

| | | |
|---|---|---|
| EP | 0 809 387 A2 | 5/1997 |
| WO | WO97/16911 | 5/1997 |
| WO | WO 98/19472 | 5/1998 |
| WO | WO 99/01826 | 1/1999 |

OTHER PUBLICATIONS

Leon Shklar et al, "Metamagic; Generating Virtual Web Sites Through Data Modeling" http://www.scope.gmd./info/www6/posters/714/poster 714.html, Apr. 1997.*

*Computer Networks*, Andrew S. Tanenbaum, pp. 410–412.

"XIIR6.3 (Broadway) Overview", http://www.x.org/broadway.htm.

"Stac Unveils Windows NT 4.0 and Web Browser Support in New ReachOut 7" http://www.stac.com/news/pressrel/pr_ro7_unveil.html.

(List continued on next page.)

*Primary Examiner*—Mehmet Geckil

(57) ABSTRACT

An Internet/Intranet World Wide Web (Web)-based centralized common interface repository system for event notifications and report outputs generated by different server applications and/or application platforms is provided as a message center. Such message center includes a common graphical user interface to a customer for viewing and receiving the report outputs and event notifications. The report outputs and event notifications are communicated in priority order using multithreading and multiprocessing mechanism wherein multiple messages may be serviced or received simultaneously. An Internet/Intranet Web-based information delivery system infrastructure capable of providing for the secure initiation, acquisition, and presentation of information from any customer computer platform having a Web browser is also provided.

23 Claims, 16 Drawing Sheets

U.S. PATENT DOCUMENTS

| | | | |
|---|---|---|---|
| 5,228,076 A | 7/1993 | Hopner et al. ............ 379/93.17 |
| 5,245,533 A | 9/1993 | Marshall ....................... 705/10 |
| 5,285,494 A | 2/1994 | Sprecher et al. ............. 455/423 |
| 5,287,270 A | 2/1994 | Hardy et al. |
| 5,315,093 A | 5/1994 | Stewart ....................... 235/381 |
| 5,325,290 A | 6/1994 | Cauffman et al. |
| 5,327,486 A | 7/1994 | Wolff et al. ................... 379/96 |
| 5,369,571 A | 11/1994 | Metts ........................... 705/10 |
| 5,452,446 A | 9/1995 | Johnson ......................... 707/1 |
| 5,475,836 A | 12/1995 | Harris et al. .................... 707/1 |
| 5,481,542 A | 1/1996 | Logston et al. |
| 5,483,596 A | 1/1996 | Rosenow et al. ........... 713/167 |
| 5,490,060 A | 2/1996 | Malec et al. .................. 705/10 |
| 5,491,779 A | 2/1996 | Bezjian ....................... 345/440 |
| 5,526,257 A | 6/1996 | Lerner ......................... 705/10 |
| 5,530,744 A | 6/1996 | Charalambous et al. .... 379/265 |
| 5,537,611 A | 7/1996 | Rajagopal et al. ..... 379/226.07 |
| 5,548,726 A | 8/1996 | Pettus ......................... 709/221 |
| 5,551,025 A | 8/1996 | O'Reilly et al. ......... 707/104.1 |
| 5,563,805 A | 10/1996 | Arbuckle et al. ........... 709/204 |
| 5,566,351 A | 10/1996 | Crittenden et al. |
| 5,602,918 A | 2/1997 | Chen et al. .................. 713/153 |
| 5,610,915 A | 3/1997 | Elliott et al. ................. 370/259 |
| 5,621,727 A | 4/1997 | Vaudreuil ................... 370/401 |
| 5,623,601 A | 4/1997 | Vu ............................... 713/201 |
| 5,630,066 A | 5/1997 | Goslina |
| 5,649,182 A | 7/1997 | Reitz ............................. 707/7 |
| 5,666,481 A | 9/1997 | Lewis .......................... 714/4 |
| 5,671,354 A | 9/1997 | Ito et al. ...................... 713/201 |
| 5,689,645 A | 11/1997 | Schettler et al. ............ 709/226 |
| 5,692,030 A | 11/1997 | Teglovic et al. .............. 379/14 |
| 5,692,181 A | * 11/1997 | Anand et al. ............... 707/102 |
| 5,696,906 A | * 12/1997 | Peters et al. ................ 709/234 |
| 5,699,403 A | 12/1997 | Ronnen ........................ 379/32 |
| 5,699,528 A | 12/1997 | Hogan .......................... 705/40 |
| 5,706,502 A | 1/1998 | Foley et al. .................. 707/10 |
| 5,708,780 A | 1/1998 | Levergood et al. ......... 709/229 |
| 5,742,763 A | 1/1998 | Jones .......................... 709/317 |
| 5,721,908 A | 2/1998 | Lagarde et al. |
| 5,721,913 A | 2/1998 | Ackroff et al. ............. 707/103 |
| 5,727,129 A | 3/1998 | Barrett et al. ................ 706/10 |
| 5,734,709 A | 3/1998 | DeWitt et al. ............... 379/207 |
| 5,734,831 A | 3/1998 | Sanders ....................... 709/223 |
| 5,742,762 A | 4/1998 | Scholl et al. ................ 709/200 |
| 5,742,768 A | 4/1998 | Gennaro et al. ............ 709/203 |
| 5,742,905 A | 4/1998 | Pepe et al. ................... 455/461 |
| 5,754,830 A | 5/1998 | Butts et al. .................. 709/311 |
| 5,764,756 A | 6/1998 | Onweller ..................... 379/242 |
| 5,768,501 A | 6/1998 | Lewis ........................... 714/48 |
| 5,774,660 A | 6/1998 | Brendel et al. .............. 709/201 |
| 5,778,178 A | 7/1998 | Arunachalam .............. 709/203 |
| 5,778,377 A | * 7/1998 | Marlin et al. ................ 707/10 |
| 5,781,550 A | 7/1998 | Templin et al. ............. 370/401 |
| 5,781,632 A | 7/1998 | Odom |
| 5,787,160 A | 7/1998 | Chaney et al. .............. 379/220 |
| 5,787,412 A | * 7/1998 | Bosch et al. ................... 707/2 |
| 5,790,780 A | 8/1998 | Brichta et al. ................ 714/46 |
| 5,790,789 A | 8/1998 | Suarez ........................ 709/202 |
| 5,790,797 A | 8/1998 | Shimada et al. ............ 709/224 |
| 5,790,809 A | 8/1998 | Holmes ...................... 706/228 |
| 5,793,762 A | 8/1998 | Penners et al. ............. 370/389 |
| 5,793,964 A | 8/1998 | Rogers et al. .............. 709/202 |
| 5,796,393 A | 8/1998 | MacNaughton et al. .... 345/329 |
| 5,799,154 A | 8/1998 | Kuriyan ...................... 709/223 |
| 5,802,320 A | 9/1998 | Baehr et al. ................ 709/249 |
| 5,805,803 A | 9/1998 | Birrell et al. ................ 713/201 |
| 5,812,533 A | 9/1998 | Cox et al. ................... 370/259 |
| 5,812,654 A | 9/1998 | Anderson et al. ........... 379/207 |
| 5,812,750 A | 9/1998 | Dev et al. |
| 5,815,080 A | 9/1998 | Taguchi ...................... 340/635 |
| 5,815,665 A | 9/1998 | Teper et al. ................. 709/229 |
| 5,819,225 A | 10/1998 | Eastwood et al. .......... 704/275 |
| 5,819,271 A | 10/1998 | Mahoney et al. .............. 707/9 |
| 5,825,769 A | 10/1998 | O'Reilly et al. ............ 370/360 |
| 5,826,029 A | 10/1998 | Gore, Jr., et al. ........... 709/227 |
| 5,826,269 A | 10/1998 | Hussey ........................ 707/10 |
| 5,835,084 A | 11/1998 | Bailey et al. ................ 345/326 |
| 5,844,896 A | 12/1998 | Marks et al. ................ 370/385 |
| 5,845,067 A | 12/1998 | Porter et al. ................ 713/200 |
| 5,845,267 A | 12/1998 | Ronen ......................... 705/40 |
| 5,848,396 A | 12/1998 | Gerace ........................ 705/10 |
| 5,850,517 A | 12/1998 | Verkler et al. .............. 709/202 |
| 5,852,810 A | 12/1998 | Sotiroff et al. ................ 705/27 |
| 5,852,812 A | 12/1998 | Reeder ........................ 705/39 |
| 5,862,325 A | * 1/1999 | Reed et al. .................. 709/201 |
| 5,870,558 A | 2/1999 | Branton, Jr. et al. ........ 709/224 |
| 5,877,759 A | 3/1999 | Bauer .......................... 709/317 |
| 5,884,032 A | 3/1999 | Bateman et al. ............ 709/204 |
| 5,892,900 A | 4/1999 | Ginter et al. ............... 713/200 |
| 5,907,681 A | 5/1999 | Bates et al. ................. 706/228 |
| 5,909,679 A | 6/1999 | Hall ............................... 707/4 |
| 5,909,682 A | 6/1999 | Cowan et al. ................. 707/9 |
| 5,915,001 A | 6/1999 | Uppaluru ................. 379/88.22 |
| 5,920,542 A | 7/1999 | Henderson ................. 370/217 |
| 5,923,016 A | 7/1999 | Fredregill et al. .......... 235/380 |
| 5,930,764 A | 7/1999 | Melchione et al. ........... 705/10 |
| 5,930,804 A | 7/1999 | Yu et al. .................. 707/104.1 |
| 5,958,016 A | 9/1999 | Chang et al. ............... 709/229 |
| 5,961,602 A | 10/1999 | Thompson et al. ......... 709/229 |
| 5,963,925 A | 10/1999 | Kolling et al. ............... 705/40 |
| 5,966,695 A | 10/1999 | Melchione et al. ........... 705/10 |
| 5,970,467 A | 10/1999 | Alavi .......................... 705/10 |
| 5,974,396 A | 10/1999 | Anderson et al. ............ 705/10 |
| 5,974,441 A | 10/1999 | Rogers et al. |
| 5,982,864 A | 11/1999 | Jagadish et al. ............ 379/115 |
| 5,982,891 A | 11/1999 | Ginter et al. ................. 705/54 |
| 5,991,733 A | 11/1999 | Aleia et al. .................... 705/8 |
| 5,991,806 A | 11/1999 | McHann Jr. .................... 709/3 |
| 5,995,948 A | 11/1999 | Whitford |
| 5,999,972 A | 12/1999 | Gish |
| 5,999,973 A | 12/1999 | Glitho et al. ................ 709/223 |
| 6,011,844 A | 1/2000 | Uppaluru et al. ...... 379/220.01 |
| 6,014,647 A | 1/2000 | Nizzari et al. ............... 705/39 |
| 6,014,702 A | 1/2000 | King et al. |
| 6,023,762 A | 2/2000 | Dean et al. .................. 713/193 |
| 6,031,901 A | 2/2000 | An et al. ............... 379/201.02 |
| 6,032,132 A | 2/2000 | Nelson ......................... 705/34 |
| 6,032,184 A | * 2/2000 | Cogger et al. .............. 709/223 |
| 6,041,325 A | 3/2000 | Shah et al. .................. 707/10 |
| 6,044,144 A | 3/2000 | Becker et al. ......... 379/265.02 |
| 6,049,602 A | 4/2000 | Foladare et al. ........ 379/265.04 |
| 6,049,789 A | 4/2000 | Smorodinsky ............... 705/59 |
| 6,058,381 A | 5/2000 | Nelson ......................... 705/40 |
| 6,064,667 A | 5/2000 | Gisby et al. ................ 370/352 |
| 6,065,002 A | * 5/2000 | Knotts et al. .................. 707/4 |
| 6,065,059 A | 5/2000 | Sushieh et al ............... 709/233 |
| 6,078,891 A | 6/2000 | Riordan et al. ............... 705/10 |
| 6,078,924 A | * 6/2000 | Ainsbury et al. ............ 707/101 |
| 6,085,171 A | 7/2000 | Leonard ....................... 705/26 |
| 6,085,190 A | * 7/2000 | Sakata ........................... 707/6 |
| 6,091,808 A | 7/2000 | Wood et al. ........... 379/201.04 |
| 6,094,655 A | 7/2000 | Rogers et al. .............. 707/710 |
| 6,115,040 A | 9/2000 | Bladow et al. .............. 345/741 |
| 6,115,458 A | 9/2000 | Taskett ........................ 379/144 |
| 6,115,693 A | 9/2000 | McDonough et al. .......... 705/10 |
| 6,115,737 A | 9/2000 | Ely et al. .................... 709/203 |
| 6,119,109 A | 9/2000 | Muratani et al. ............ 705/400 |
| 6,128,624 A | * 10/2000 | Papierniak et al. ......... 707/104 |
| 6,131,095 A | 10/2000 | Low et al. .................... 707/10 |
| 6,134,584 A | 10/2000 | Chang et al. ............... 709/219 |
| 6,137,869 A | 10/2000 | Voit et al. |

| | | | |
|---|---|---|---|
| 6,145,001 A | 11/2000 | Scholl et al. | 709/223 |
| 6,161,128 A | 12/2000 | Smyk | 709/205 |
| 6,212,506 B1 | 4/2001 | Shah et al. | 705/418 |
| 6,212,558 B1 | 4/2001 | Antur wt al. | 709/221 |
| 6,253,239 B1 * | 6/2001 | Shklar et al. | 709/217 |

OTHER PUBLICATIONS

Chapman, D. Brent et al., "Building Interbet Firewalls ", Nov. 1995, O'Reilly & Associates, p. 58.

He, Taniguchi, "Internet Traffic Control and Management Architecture", IEEE, Oct. 22–24, 1998, pp. s46–03–1 –s46–03–5.

Sixth International Conference on Network Protocols, IEEE, Technical Communication Services, 13–16 October 1996, Table of Contents.

Markovich, Robert, "WAN Service Level Management Could Keep Your Feet Out of the Fire, Ensure Carriers Dilligence", Network World, Jul. 7, 1997.

Jainschigg, J., "Billing confirmed: this easy–to–use box turns guest calls into revenue." *Teleconnect,*vol. 12, No. 9. p. 39(4).

Biggs, M., "Help for the Web enhances customer support, reduces help desk load" Inforworld, Jun. 16, 1997, v. 19, no. 24, p.82+.

Burch, B., "AT&T, MCI to release new management tools", Network World, Jan. 17, 1994, p. 19.

Low, C., "Integrating Communication Services",*IEEE Communication Magazine*, Jun. 1997, pp. 164 –169.

"McAfee's New 'Self –Sevice 'Help Desk Web Suite Makes PCs Help Desk –Ready", newswire Association Inc., Oct. 13, 1997.

Niemeyer, R., "Using Web Technologies in Two MLS Environments: Security Analysis. "IEEE, pp. 205–214, 1997.

Porter, T., "MCI offers tracking system: Direct Dispatch lets users eye problems remotely", Service News, Apr. 1994, p. 17.

Vizard, M. et al., "MCI to Pilot Convergence Billing Service", InfoWorld, v. 18, Issue 37, Sep. 9, 1996.

Yager, T., "Mixed Messages", UNIX Reciew, v. 16, n. 2, p. 29, Feb. 1998.

"Carriers Improve Net Management Services", Communications Week, May 2, 1994, p. 74.

"Network management; new software platform enhances network management capabilities; MCI ServiceView offers greater cost savings, increased flexibility.", Product Announcement, Edge, Oct. 2, 1995, on & about AT&T v. 10, n. 375, p.11(1).

"New software platform enhances network management capabilities...", Business Wire, Sep. 28, 1995 p. 9281122.

"User's Guide: Microsoft Access"Microsoft Corporation, 1994. pp. 378, 594, 599, 630–632 (13).

* cited by examiner

| Range/Distance Description | Calls | %Calls | Minutes | %Min | Amount | %Amt | Avg Min/Call | Avg Amt/Call |
|---|---|---|---|---|---|---|---|---|
| 114 | 57 | 62.00 | 36.00 | 61.00 | $58.00 | 63.00 | 64.00 | 66.00 |
| Sim2 | 10 | 70.50 | 70.50 | 70.50 | $100.00 | 70.50 | 70.50 | 70.50 |
| Sim3 | 11 | 71.50 | 71.50 | 71.50 | $101.00 | 71.50 | 71.50 | 71.50 |
| Sim4 | 12 | 72.50 | 72.50 | 72.50 | $102.00 | 72.50 | 72.50 | 72.50 |
| Sim5 | 13 | 73.50 | 73.50 | 73.50 | $103.00 | 73.50 | 73.50 | 73.50 |
| Sim6 | 14 | 74.50 | 74.50 | 74.50 | $104.00 | 74.50 | 74.50 | 74.50 |
| Sim7 | 15 | 75.50 | 75.50 | 75.50 | $105.00 | 75.50 | 75.50 | 75.50 |
| Sim8 | 16 | 76.50 | 76.50 | 76.50 | $106.00 | 76.50 | 76.50 | 76.50 |
| Sim9 | 17 | 77.50 | 77.50 | 77.50 | $107.00 | 77.50 | 77.50 | 77.50 |
| Sim10 | 18 | 78.50 | 78.50 | 78.50 | $108.00 | 78.50 | 78.50 | 78.50 |
| Sim11 | 19 | 79.50 | 79.50 | 79.50 | $109.00 | 79.50 | 79.50 | 79.50 |
| Sim12 | 20 | 80.50 | 80.50 | 80.50 | $110.00 | 80.50 | 80.50 | 80.50 |
| Sim13 | 21 | 81.50 | 81.50 | 81.50 | $111.00 | 81.50 | 81.50 | 81.50 |
| Sim14 | 22 | 82.50 | 82.50 | 82.50 | $112.00 | 82.50 | 82.50 | 82.50 |
| Sim15 | 23 | 83.50 | 83.50 | 83.50 | $113.00 | 83.50 | 83.50 | 83.50 |
| Sim16 | 24 | 84.50 | 84.50 | 84.50 | $114.00 | 84.50 | 84.50 | 84.50 |
| Sim17 | 25 | 85.50 | 85.50 | 85.50 | $115.00 | 85.50 | 85.50 | 85.50 |
| Sim18 | 26 | 86.50 | 86.50 | 86.50 | $116.00 | 86.50 | 86.50 | 86.50 |
| Sim19 | 27 | 87.50 | 87.50 | 87.50 | $117.00 | 87.50 | 87.50 | 87.50 |
| Sim20 | 28 | 88.50 | 88.50 | 88.50 | $118.00 | 88.50 | 88.50 | 88.50 |

FIG. 12

MULTI-THREADED WEB BASED USER INBOX FOR REPORT MANAGEMENT

CROSS-REFERENCE TO RELATED APPLICATIONS

The following patent application is based on and claims the benefit of U.S. Provisional Patent Application Ser. No. 60/060,655 filed Sep. 26, 1997.

BACKGROUND OF THE INVENTION

1. Field of the Invention

The present invention relates to an electronic information delivery system, and particularly, to an Internet/Intranet-based reporting, presentation, and notification system for customers requesting information from remotely located back-end servers of telecommunications service entities via the World Wide Web (Web).

2. Background Art

Major telecommunications service entities presently provide for the presentation and dissemination of customer account and network management information to their customers predominantly through a Windows-based graphical user interface resident on a personal computer. Typically, service entity customers are enabled to directly dial-up, e.g., via a modem, or alternately, via dedicated communication lines, e.g., ISDN, T-1, etc., to the entity's mainframe applications, and initiate the generation of reports of their requested account information through the graphical user interface. The report requests initiated by the customer are processed by the entity's legacy applications, which retrieve the requested customer's information from one or more databases, and process and format the information for downloading to the client's reporting graphical user interface.

The telecommunications service providers offer many different services which have been developed independently over time, and which operate on many different operating platforms. For instance, MCI's Service View platform ("MSV") provides for the generation of toll free network management data, priced call detail or "Perspective" data for usage analysis and trending, and unpriced call detail or real-time "TrafficView" data each of which requires a different reporting mechanism due to the nature of the data being presented and the legacy application which generates it. For example, much of the customers "Perspective" data is provided on a CD-ROM media and shipped to the customer, usually on a monthly basis, and requires extensive client-side processing to utilize the data. This cuts down on computing resources as the customer requires a dedicated application and graphical user interface to process this type of data. Furthermore, such systems do not readily provide for the scheduling of periodic or ad hoc "one-shot" reports.

Therefore, it would be desirable to provide an Internet/Intranet World Wide Web (Web)-based reporting system that provides a common graphical user interface enabling both report requesting, customizing and viewing of various types of data from different server applications.

It would also be highly desirable that this reporting paradigm be asynchronous; that is, the customer may request a report, and then continue using the system or other applications on the workstation while the report is processed at the server. When the report is completed, the server deposits the report results into an inbox, and notification appears in a message center at the client terminal. At any point thereafter, at the customer's convenience, the report may be downloaded and viewed, saved, etc. This paradigm preserves the responsiveness of the platform and emphasizes the customer's control of the system.

The inbox may be used as a general conduit for messages to the customer; news of available upgrades, problems with the servers, problems with report requests, promotional announcements, product offerings, etc. Messages may remain in the customer's inbox until they are deleted by the customer, or expired after a predetermined period.

Although this paradigm is very much like e-mail, and the implementation may share many e-mail like characteristics, such as "store-and-forward" reporting and message forwarding architecture, the actual e-mail SMTP protocol cannot support many of the features required by the Web-based reporting and messaging system such as concurrent processing and handling of large data storage as the back-end repository and recoverable downloads to the client platform. Therefore, it would be highly desirable to provide an inbox client/server system having a capability to handle multi-threading for high-priority messages, guaranteed delivery, and recoverable downloads.

SUMMARY OF THE INVENTION

Accordingly, to overcome the above shortcomings, the present invention provides an Internet/Intranet World Wide Web (Web)-based centralized common interface repository system for event notifications and report outputs generated by different server applications and/or application platforms.

The present invention further provides a common graphical user interface to a customer for viewing and receiving the report outputs and the event notifications for all application services. In addition, the present invention provides an Internet/Intranet Web-based information delivery system infrastructure capable of providing for the secure initiation, acquisition, and presentation of information from any customer computer platform having a Web browser.

The present invention further provides an Internet/Intranet Web-based client-server communications infrastructure capable of transmitting and receiving multiple messages simultaneously over a plurality of secure communications links. With this mechanism, a high priority message may be communicated to a customer in real time, even when a duration-intensive download of a large file is taking place, for example.

Further yet, the present invention provides a well-organized and efficiently accessible directory structure for storing different application servers and/or application platform information in a central Intranet/Intranet repository system. For example, each application utilizing the inbox system may have its own predetermined directory space in which to place its data.

For attaining the above functionalities, the present invention includes a client browser application located at the client workstation. The client browser application enables an interactive web-based communications with the inbox system and provides an integrated interface to the one or more enterprise application services. A customer may access the inbox system with an inbox client application, which is typically launched by the client browser application.

The present invention also includes at least one secure server for managing client sessions over the Internet/Intranet network. The secure server supports secure socket connections enabling encrypted communications between the client browser application and the secure server. At the enterprise side, the application servers associated with different services typically generate customer specific data and place the data in the inbox server. The inbox server stores and maintains the customer specific data. The data includes report data and notification data received from the enterprise application servers, and also a metadata description of the report data. The metadata typically represents report standards and options for customizing the report standards. The report data and the metadata associated with the report data may be downloaded to the client browser application via the secure server for generation of reports according to the metatdata description. The reports may then be presented to the customer at the client workstation. The inbox server also accepts news and information data other than reports from the various enterprise application services. The news and additional information may then be retrieved by the customer via the inbox client application at the client workstation.

Further benefits and advantages of the invention will become apparent from a consideration of the following detailed description.

BRIEF DESCRIPTION OF THE DRAWINGS

Preferred embodiments of the present invention will now be described, by way of example only, with reference to the accompanying drawings in which:

FIG. 12 illustrates a sample spreadsheet display; and

DESCRIPTION OF THE PREFERRED EMBODIMENT

An Overview of the Web-enabled Integrated System

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the nMCI Interact system architecture is basically organized as a set of common components comprising the following:

1) an object-oriented software architecture detailing the client and server based aspect of nMCI Interact;

2) a network architecture defining the physical network needed to satisfy the security and data volume requirements of the networkMCI System;

3) a data architecture detailing the application, back-end or legacy data sources available for networkMCI Interact; and 4) an infrastructure covering security, order entry, fulfillment, billing, self-monitoring, metrics and support.

Each of these common component areas will be generally discussed hereinbelow. A detailed description of each of these components can be found in a related, co-pending U.S. patent application Ser. No. 09/159,695 entitled INTEGRATED BUSINESS SYSTEM FOR WEB BASED TELECOMMUNICATIONS MANAGEMENT, the disclosure of which is incorporated herein by reference thereto.

Figure 1:
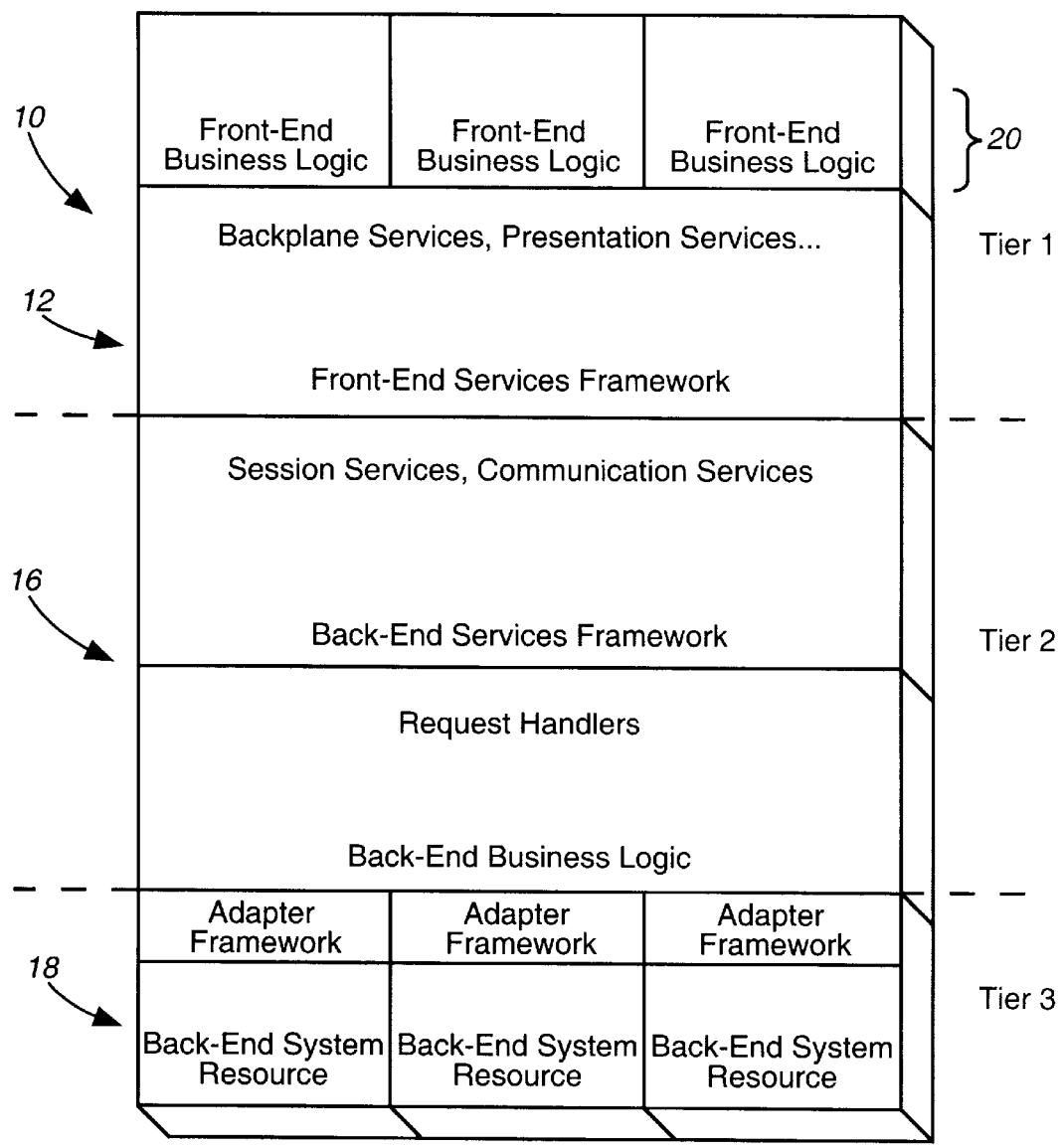
FIG. 1 illustrates the software architecture component comprising a three-tiered structure.

FIG. 1 is a diagrammatic illustration of the software architecture component in which the present invention functions. A first or client tier 10 of software services are resident on a customer workstation 10 and provides customer access to the enterprise system, having one or more downloadable application objects directed to front-end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additional applications are directed to front-end services such as the presentation of data in the form of tables and charts, and data processing functions such as sorting and summarizing in a manner such that multiple programs are combined in a unified application suite.

A second or middle tier 16, is provided having secure web servers and back-end services to provide applications that establish user sessions, govern user authentication and their entitlements, and communicate with adaptor programs to simplify the interchange of data across the network.

A third or back-end tier 18 having applications directed to legacy back-end services including database storage and retrieval systems and one or more database servers for accessing system resources from one or more legacy hosts.

Generally, as explained in co-pending U.S. Pat. No. 6,115,040, entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or call management functions. The system is capable of delivering to customers the functionality appropriate to their product mix.

Figure 2:
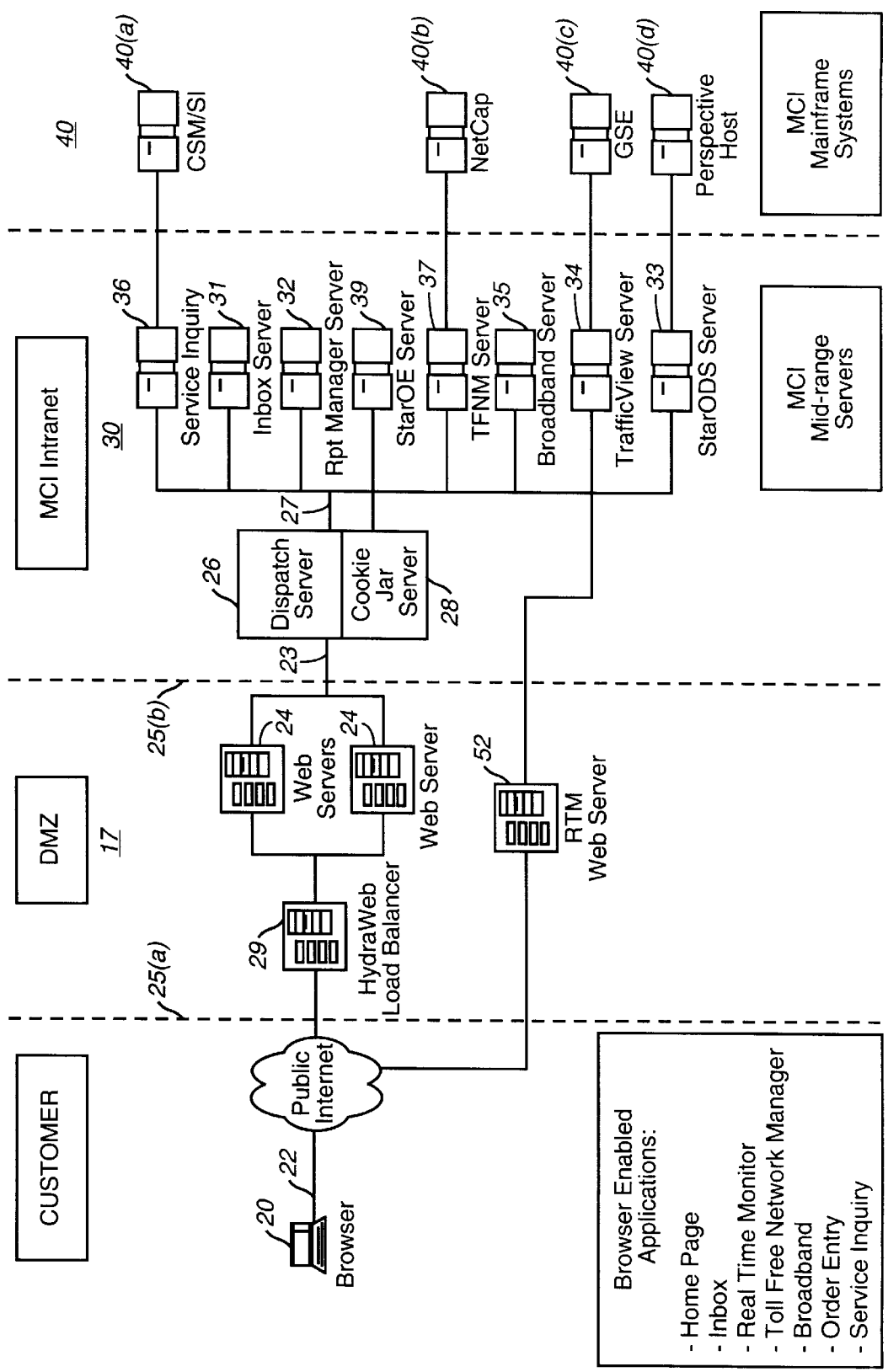
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
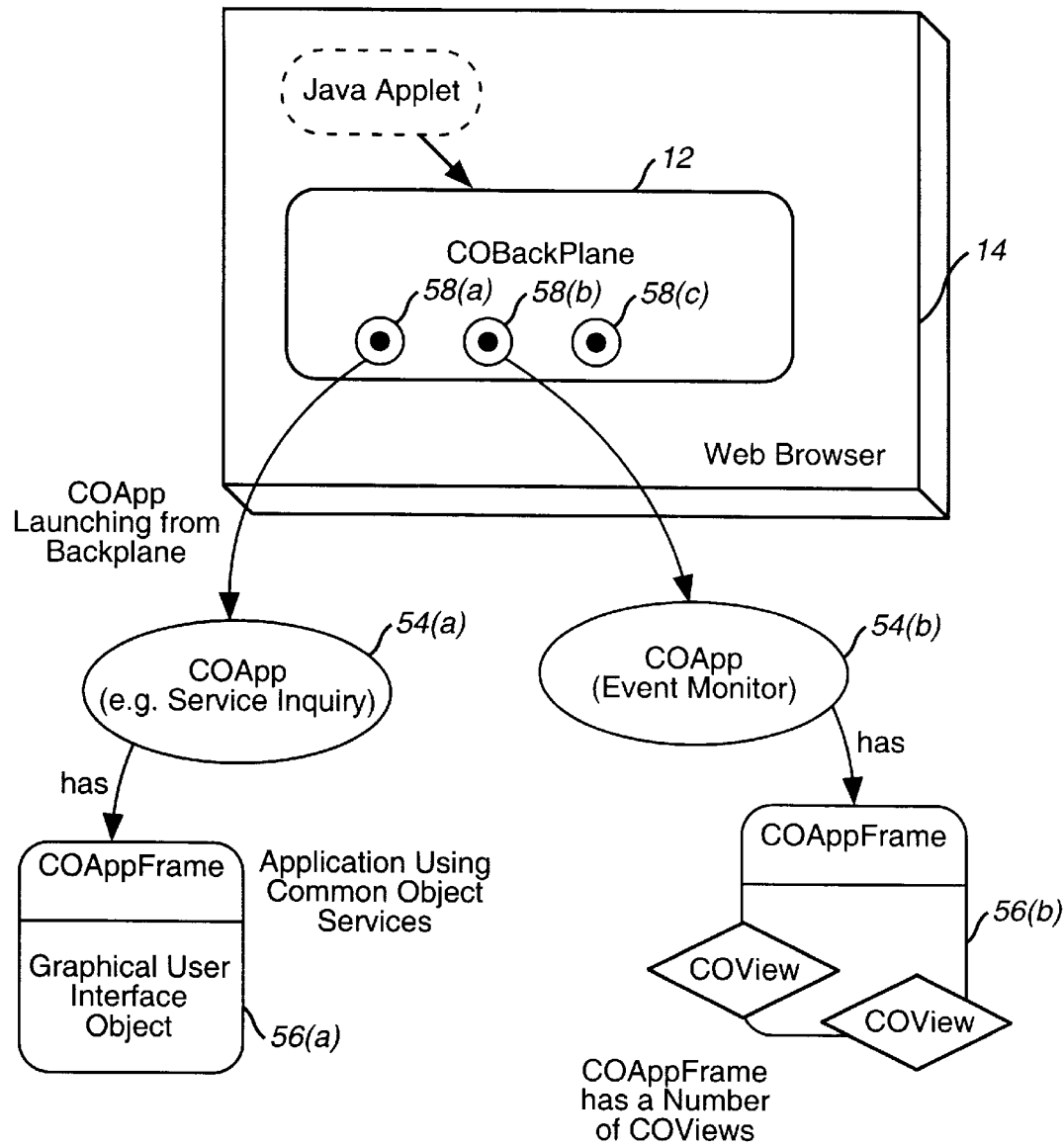
FIG. 3 is an illustrative example of a backplane architecture schematic viewed from a home page of the present invention.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, co-pending U.S. Pat. No. 6,115,040 entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects that provide the front-end business logic. The backplane services layer 12 also manages the launching of the application objects. The network-MCI Interact common set of objects provide a set of services to each of the applications. The set of services include: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which may be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Event Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
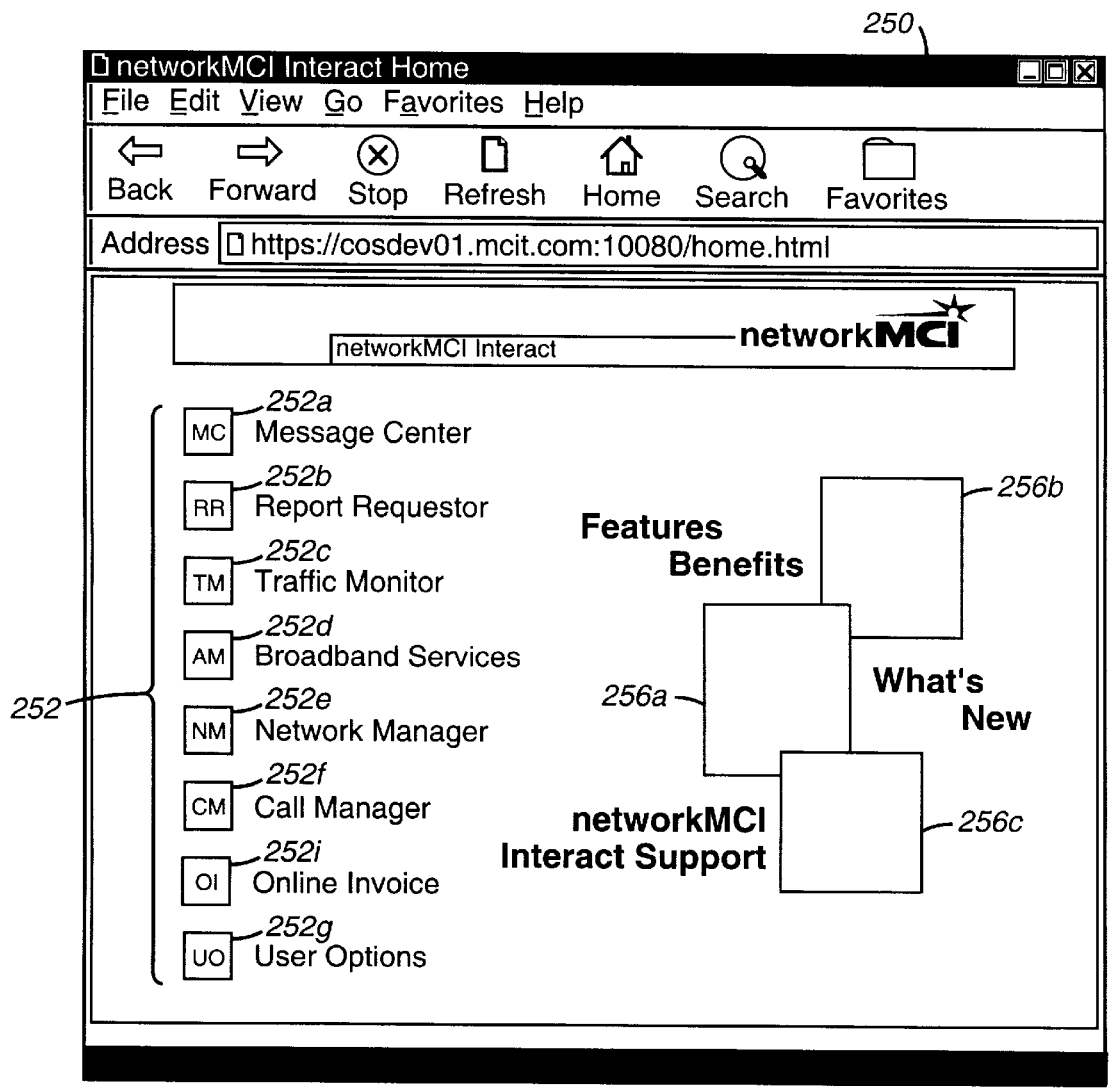
FIG. 4 illustrates an example client GUI presented to the client/customer as a browser web page.

FIG. 4 illustrates an example client GUI presented to the client/customer as a browser web page 250 providing, for example, a suite 252 of network management reporting applications including: MCI Traffic Monitor 252c; Call Manager 252f; a Network Manager 252e and Online Invoice 252i. Access to network functionality is also provided through Report Requester 252b, which provides a variety of detailed reports for the client/customer and a Message Center 252a for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm, and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init(), start(), stop() and run(). In the init() method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchApp() method. The launched application then may use the backplane for inter-application communications, including retrieving Inbox data.

The COBackPlane 12 includes methods for providing a reference to a particular COApp, for interoperation. For example, the CoBackPlane class provides a getApp() method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, U.S. Pat. No. 6,115,040 entitled GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session. After establishing that the request has come from a valid user and mapping the request to its associated session, the DMZ Web servers 24 re-encrypt the request using symmetric encryption and forward it over a second socket connection 23 to the dispatch server 26 inside the enterprise Intranet.

As described in greater detail in co-pending U.S. patent application Ser. No. 09/159,514 entitled SECURE CUSTOMER INTERFACE FOR WEB-BASED DATA MANAGEMENT, the contents and disclosure of which are incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 unwraps an outer protocol layer of the message from the DMZ services cluster 24, and re-encrypts the message with symmetric encryption and forwards the message to an appropriate application proxy via a third TCP/IP socket 27. While waiting for the proxy response all three of the sockets 22, 23, 27 block on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from the StarOE server 49, the server component of the present invention, at logon time and cached.

If the requester is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting services are acting as clients to the application servers providing the services. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages; a Report Manager proxy capable of communicating with a system-specific Report Manager server 32 for generation, management and receipt notification of customized reports; a Report Scheduler proxy for performing the scheduling and requests of the customized reports. The customized reports include, for example: call usage analysis information provided from the StarODS server 33; network traffic analysis/ monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. For example, the Services Inquiry server 36 includes communication with MCI's Customer Service Management legacy platform 40(a). Such network management and customer network data is additionally accessible by authorized MCI management personnel. As shown in FIG. 2, other legacy platforms 40(b), 40(c) and 40(d) may also communicate individually with the Intranet servers for servicing specific transactions initiated at the client browser. The illustrated legacy platforms 40(a)–(d) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the Internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
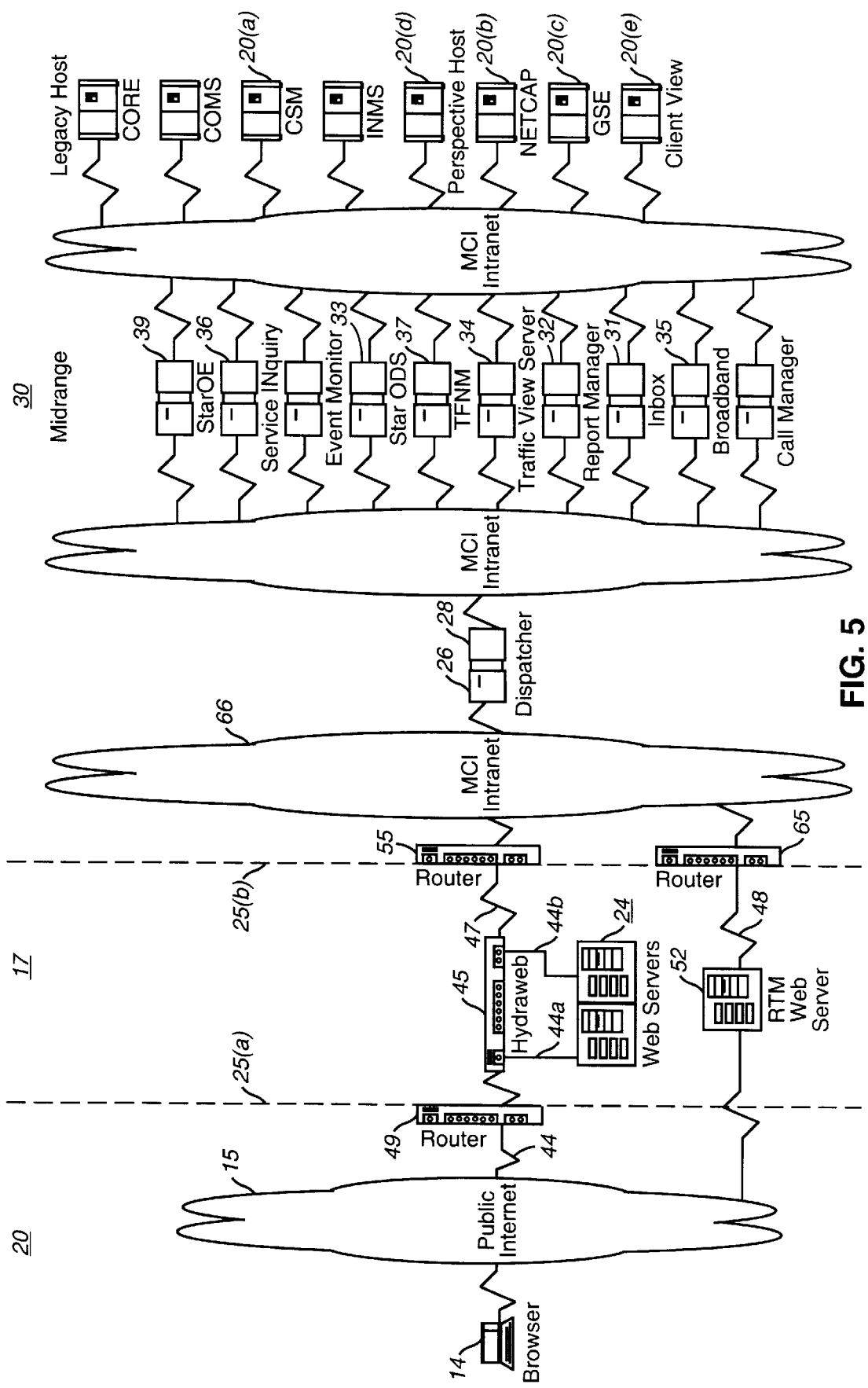
FIG. 5 is a diagram depicting the physical networkMCI Interact system architecture.

FIG. 5 is a diagram depicting the physical networkMCI Interact system architecture 10. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back-end business logic applications.

As illustrated in FIG. 5, the present invention includes a double or complex firewall system that creates EL "demilitarized zone" (DMZ) between two firewalls 25a, 25b. In the preferred embodiment, one of the firewalls 29 includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 25a in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The HydraWEB™ unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant HydraWEB™ unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 23. Via the HydraWEB5™ unit 45, a TCP/IP connection 38 links the Secure Web server 24 with the MCI Intranet Dispatcher server 26.

Further as shown in the DMZ 17 is a second RTM server 52 having its own connection to the public Internet via a TCP/IP connection 48. As described in co-pending U.S. patent application Ser. No. 09/159,516 entitled INTEGRATED PROXY INTERFACE FOR WEB BASED TELECOMMUNICATIONS MANAGEMENT TOOLS, incorporated by reference as if fully set forth herein, this RTM server provides real-time session management for subscribers of the networkMCI Interact Real Time Monitoring system. An additional TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWEB™ 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 will re-encrypt the request using symmetric RSA encryption and forward it over a second secure socket connection 23 to the dispatch server 26 inside the enterprise Intranet.

As described herein, and in greater detail in co-pending U.S. patent application Ser. No. 09/159,695, the data architecture component of networkMCI Interact reporting system is focused on the presentation of real time (un-priced) call detail data, such as provided by MCI's TrafficView Server 34, and priced call detail data and reports, such as provided by MCI's StarODS Server 33 in a variety of user selected formats.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected.

A common database may be maintained to hold the common configuration data which may be used by the GUI applications and by the mid-range servers. Such common data includes but are not limited to: customer security profiles, billing hierarchies for each customer, general reference data (states, NPA's, Country codes), and customer specific pick lists: e.g., ANI's, calling cards, etc. An MCI Internet StarOE server manages the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data is typically resident in a Report Manager server database and managed by the Report Manager.

The Infrastructure component of the nMCI Reporting system includes mechanisms for providing secure communications regardless of the data content being communicated. As described in detail in above-referenced, co-pending U.S. patent application Ser. No. 09/159,514, the nMCI Interact system security infrastructure includes: 1) authentication, including the use of passwords and digital certificates; 2) public key encryption, such as employed by a secure sockets layer (SSL) encryption protocol; 3) firewalls, such as described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the present invention, the Order Entry ("StarOE") service. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; and, 14) Online invoicing.

The self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of mechanisms to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. Pat. No. 6,115,040, the client-tier software is organized into a "component" architecture supporting such applications as inbox fetch and inbox management, report viewer and report requester, TFNM, Event Monitor, Broadband, Real-Time Monitor, and system administration applications. Further functionality integrated into the software architecture includes applications such as Outbound Network Manager, Call Manager, Service Inquiry and Online invoicing.

Inbox Application

The present invention is directed to an inbox service, a horizontal service supplied by the "networkMCI Interact" for use by all applications to share. The inbox provides a repository for application event notifications and report outputs, and also supports the "StarWRS" Internet reporting system, another horizontal service, which is described in the co-pending U.S. patent application Ser. No. 09/159,409, and which is fully incorporated herein. The horizontal services are utilized across the Intranet applications to promote a common interface for the services in order to reduce complexity, to centralize and ensure the system and application security, to promote reusability of code, and to monitor and report on the Intranet application traffic.

Integration with the Reporting System

Figure 6:
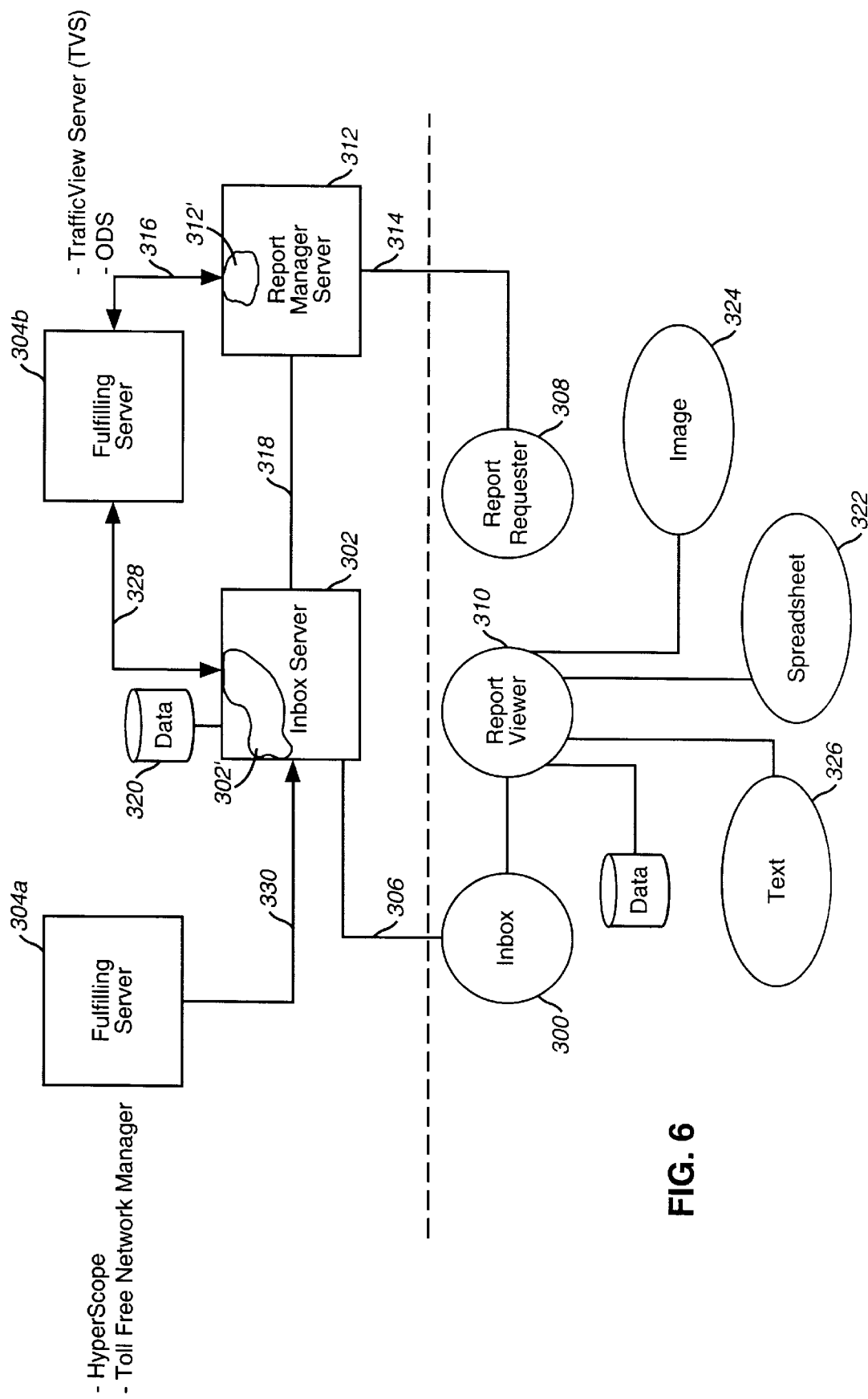
FIG. 6 is a block diagram depicting the physical architecture of the inbox components and their relationship with other fulfilling systems of the networkMCI interact.

FIG. 6 is a block diagram depicting the physical architecture of the inbox components and their relationship with other fulfilling systems of the networkMCI interact. The inbox system comprises an inbox client application 300 associated with the client GUI front-end for interacting with a customer, and a middle-tier inbox server 302 communicating with various Intranet applications (fulfilling servers) 304a, 304b. The Web servers and dispatch servers previously described with respect to FIGS. 2 and 5 have been omitted from FIG. 6 to simplify the explanation. The inbox server 302 component serves as the repository where the completed user report data and event notification data are stored, maintained, and eventually deleted and is the source of data that is downloaded to the client user via the dispatcher (FIG. 2) over a secure socket connection 306.

The inbox system is implemented as a part of "StarWRS", a networkMCI Interact reporting system whose components operate closely together in providing an integrated tool for defining and managing the generation and presentation of specific reports that are available to customers. As shown in FIG. 6, "StarWRS" comprises the following components and messaging interfaces:

1) those components associated with the client GUI front-end including a report requester client application 308, a report viewer client application 310, and an inbox client application 300 as explained previously, which implement the logical processes associated client platform applications launched from the backplane (FIG. 3) that enable the display and creation of reports and graphs based on the fields of the displayed reports, and, allows selection of different reporting criteria and options for a given report; and, 2) those middle-tier server components enabling the reporting functionality including a report manager server 312, a report scheduler server (not shown), and an inbox server 302.

Each of these components will now be described with greater particularity herein below in relation to the functionality of the inbox system. The "StarWRS" reporting system is described in detail in commonly owned U.S. patent application Ser. No. 09/159,409.

The report manager server 312 is an application responsible for the synchronization of report inventory with the back-end "fulfilling" servers 304a, 304b; retrieval of entitlements, i.e., a user's security profiles, and report pick list information, i.e., data for user report customization options, from the system Order Entry server (not shown); the transmission of report responses or messages to the Dispatcher server (not shown); the maintenance of the reporting databases; and, the management of metadata used for displaying reports. In the preferred embodiment, the Report manager server 312 employs a Unix daemon that passively listens for connect requests from the GUI client applications and other back-end servers and deploys the TCP/IP protocol to receive and route requests and their responses. Particularly, Unix stream sockets using the TCP/IP protocol suite are deployed to listen for client connections on a well-known port number on the designated host machine. Client processes, e.g., report requester 308, wishing to submit requests connect to report manager 312 via the dispatcher (not shown) by providing the port number and host name associated with Report manager 312. Request messages received by the Report manager server 312 are translated into a "metadata" format and are validated by a parser object built into a report manager proxy 312' that services requests that arrive from the GUI front-end. If the errors are found in the metadata input, the Report manager 312 returns an error message to the requesting client. If the metadata passes the validation tests, the request type is determined and data is retrieved in accordance with the meta data request after which a standard response is sent back to the requesting client.

In FIG. 6, interface SSL sockets 314 are shown connecting the Report manager server 312 and the report requester 308, via the dispatch server (not shown), and other socket connections 316 are shown interfacing with respective back-end servers 304b. In one embodiment, a server may provide a customer's priced billing data through a Talarian® smart socket messaging interface to the Report Manager. Particularly, as described in commonly owned, co-pending U.S. patent application Ser. No. 09,159,684, a back-end billing application known as "StarODS", provides such priced billing data. Additionally, as shown in FIG. 6, real-time traffic data is sent directly to the report manager 312 from the Traffic View server ("TVS") 304b. Although not shown in FIG. 6, it should be understood that the report manager 312 server may manage reporting data for customer presentation from other back-end servers including, e.g., broadband, toll free network management, and event monitor servers, etc. in order to present to a customer these types of billing/management data.

The report manager server additionally utilizes a database, such as provided by Informix, to provide accounting of metadata and user report inventory. Preferably, an SQL interface is utilized to access stored procedures used in processing requests and tracking customer reports. A variety of C++ tools and other tools such as Rogue Wave® tools.h++ are additionally implemented to perform metadata message parsing validation and translation functions. The report manager server 312 additionally includes the scheduling information, which information is passed to the back-end fulfilling servers 304b and stored by them.

The report scheduler server component (not shown) is, in the preferred embodiment, a perpetually running Unix daemon that deploys the TCP/IP protocol to send requests to the back-end fulfilling servers such as the StarODS server, TVS 304b and receive their responses. More particularly, the report scheduler server 260 is a Unix server program that is designed to handle and process report requests to the fulfilling servers by deploying Unix stream sockets using the TCP/IP protocol suite, sending the report request to client connection on a well-known port number on the designated host machine. Although not shown, interface socket connections interface with respective back-end servers 304b.

In the case of priced billing data from StarODS, report requests are published by the report scheduler server to a pre-defined subject to an interface object, for example, written in C++, that encapsulates Talarian complexity. When handling other incoming messages published by back-end servers using Talarian SmartSockets 4.0, another daemon process is necessary that uses Talarian C++ objects to connect their message queue and extract all messages for a given subject for storage in a database table. Each message includes the track number of the report that was requested from the fulfilling server.

From the report scheduler interface, the user may specify the type of reporting, including an indication of the scheduling for the report, e.g., hourly, daily, weekly or monthly. For priced data the user has the option of daily, weekly, or monthly. For real-time, or unpriced data, the user has the option of hourly, daily, weekly or monthly. The report requester interface additionally enables a user to specify a page or E-mail account so that an e-mail or page message may be sent to indicate when a requested report is in the Inbox server 302.

The report scheduler server interfaces directly with the report manager server 312 to coordinate report request processing. It should be understood that the respective report management and scheduling functions may be performed in a single server, for example, by the report manager server 312, as shown.

The Inbox Server 302 serves as the repository where the completed user report data is stored, maintained, and eventually deleted and is the source of data that is downloaded to the client user via the dispatcher (FIG. 2) over a secure socket connection 306. It is also a Unix program that is designed to handle and process user requests submitted in metadata format using a database 320, typically a commercial off- the-shelf database such as Informix.

The fulfilling servers such as the Broadband, and Toll Free Network Manager 304a, and StarODS and TVS 304b, Report Scheduler server, and any other back-end or fulfilling servers (not shown), may send report results and event notifications to the inbox server 302. The fulfilling servers, and Report Manager server may communicate to the inbox server 302 by making requests to the inbox proxy 302'. The proxy, generally waits for a request from an application and then services the request.

The proxy's main responsibility is to process requests by either handling them internally within the inbox proxy 302' or forwarding them to the inbox server 302, and then responding back to the client (i.e., the fulfilling servers in this case). In order to maintain secure connectivity throughout the system, the inbox proxy 302' uses the application program interfaces (APIs) provided by the "networkMCI Interact" supporting different types of data transport mechanisms: synchronous transaction; asynchronous transaction; and, synchronous bulk transfer. The transport mechanisms are implemented as sockets message protocol, and the proxy handles its conversation processing on a thread or process per conversation basis for servicing multiple simultaneous clients.

As an alternative to the transports above, the inbox server 302 offers direct File Transport Protocol (FTP) "put" for very large transfers in order to alleviate some of the network server loads. The fulfilling servers 304*a*, 304*b* with large data transfers typically use the common shareware compression format ZIP which is also PKZIP compatible. Alternately, the fulfilling servers 304*a*, 304*b* distributing information via the inbox may "put" the data to the inbox and defer zipping until after the inbox receives the data.

The fulfilling servers, when placing the data in the inbox, typically notify the report manager server 312 they are adding new data in the inbox. The report manager 312 then retrieves and FTPs the appropriate metadata associated with the new data in the inbox, notifying the inbox of the new additions to the inbox, i.e., the new data and the associated metatdata. The metadata is then stored in the inbox server database 320 along with the report results. Thus, if the metadata is required to be changed, it does not interfere with the information needed to display the reports included in the inbox.

The Inbox Client GUI Application

With regard to the front-end client GUI components, the above-mentioned inbox client application 300 functions as an interface between the client software and the inbox server 302 for presenting to the customer the various types of reports and messages received at the inbox including all completed reports, call detail, and marketing news messages. Preferably, the messages for the user in the inbox is sorted by type, and then by report type, report name, date, and time.

In a preferred embodiment, the inbox client application 300 is implemented using the COApp class provided by the "networkMCI Interact" common object classes and uses the services of the common objects. The common objects are described in the U.S. Pat. No. 6,115,040, which is fully incorporated by reference herein.

The inbox client application 300 uses the services of the backplane (FIG. 3) to launch other applications as needed to process report messages. For example, if an alarm is generated via the Event Monitor, regarding a fiber outage that impacts a customer's toll free circuit, an option allows the user to go directly from the alarm message in the inbox to the appropriate alternate routing plan by launching the TFNM application for finding the routing plan.

The inbox client 300 also uses the services of the data export objects to provide a save/load feature for inbox messages, and, is used to provide a user-interface for software upgrade/download control.

In a preferred embodiment, the inbox client includes a thread that polls periodically, e.g., every five minutes, for a list of reports. The polling thread typically looks for new additions to the list of messages currently displayed on the screen. If the polling thread finds a new addition, the screen display is updated accordingly.

The report requester application 308 is a GUI applet enabling user interaction for managing reports and particularly includes processes supporting: the creation, deletion, and editing of the user's reports; the retrieval and display of selected reports; the display of selected option data; and the determination of entitlements which is the logical process defining what functionality a user may perform on Star-WRS. In the preferred embodiment, a report request may be executed immediately, periodically, or as "one-shots" to be performed at a later time. As described herein, the report scheduler service maintains a list of requested reports for a given user, and forwards actual report requests to the appropriate middle-tier servers at the appropriate time. Additional functionality is provided to enable customers to manage their inventory, e.g., reschedule, change, or cancel (delete) report requests.

The report viewer application 310 is a GUI applet enabling a user to analyze and display the data and reports supplied from the fulfilling servers such as StarODS and "TVS" 304*b*, and other systems such as broadband and toll free network manager 304*a* via the inbox 300, 302. Particularly, the report manager 312 includes and provides access to the metadata which is used to tell the report requestor what a standard report should look like and the "pick-list" options the user has in order for them to customize the standard report. It is used to tell the report viewer client how to display the report, what calculations or translations need to be performed at the time of display, and what further customization options the user has while viewing the report. It additionally includes a common report view by executing a GUI applet that is used for the display and graphing of report data and particularly, is provided with spreadsheet management 322 functionality that defines what operations may be performed on the spreadsheet including the moving of columns, column hiding, column and row single and multiple selection, import and export of spreadsheet data, printing of spreadsheet, etc. It is also provided with report data management functionality by defining what operations may be performed on the data displayed in a spreadsheet including such dynamic operations as sorting of report data, sub-totaling of report data, etc. Furthermore, the report viewer 310 provides a functionality enabling the interpretation of metadata. The report viewer application 310 may also be able to accept messages telling it to display an image 324 or text 326 that may be passed by one of the applications in lieu of report data (e.g., invoice, broadband report, etc.)

All reporting is provided through the report viewer interface which supports spreadsheet, a variety of graphic and chart types, or both types simultaneously. The spreadsheet presentation allows for sorting by any arbitrary set of columns. The report viewer 310 is launched from the inbox client 300 when a report is selected and may also be launched from applications directly if a report is generated in real time.

By associating each set of report data which is downloaded via the inbox server 302 with a "metadata" report description object, reports may be presented without report-specific presentation code. At one level, these metadata descriptions function like the catalog in a relational database, describing each row of a result set returned from the middle tier as an ordered collection of columns. Each column has a data type, a name, and a desired display format, etc. Column descriptive information may be stored in an object, and the entire result set may be described by a list of these objects, one for each column, to allow for a standard viewer to present the result set, with labeled columns. Nesting these descriptions within one another allows for breaks and subtotaling at an arbitrary number of levels. If the standard viewer must be extended for a particular report with elaborate formatting or data manipulation, it may be subclassed. Since Java may create class instances by name, the report description object could simply supply the name of the derived class and the standard report launching methods would still support the report. The same metadata descriptions may be used to provide common data export and report printing services. When extended to describe aggregation levels of data within reporting dimensions, it may even be used for generic rollup/drilldown spreadsheets with "just-in-time" data access.

The metadata data type may include geographic or telecommunications-specific information, e.g., states or NPAs. The report viewer may detect these data types and provide a geographic view as one of the graph/chart types.

The Inbox and Report Retrieving Procedure

Figure 7:
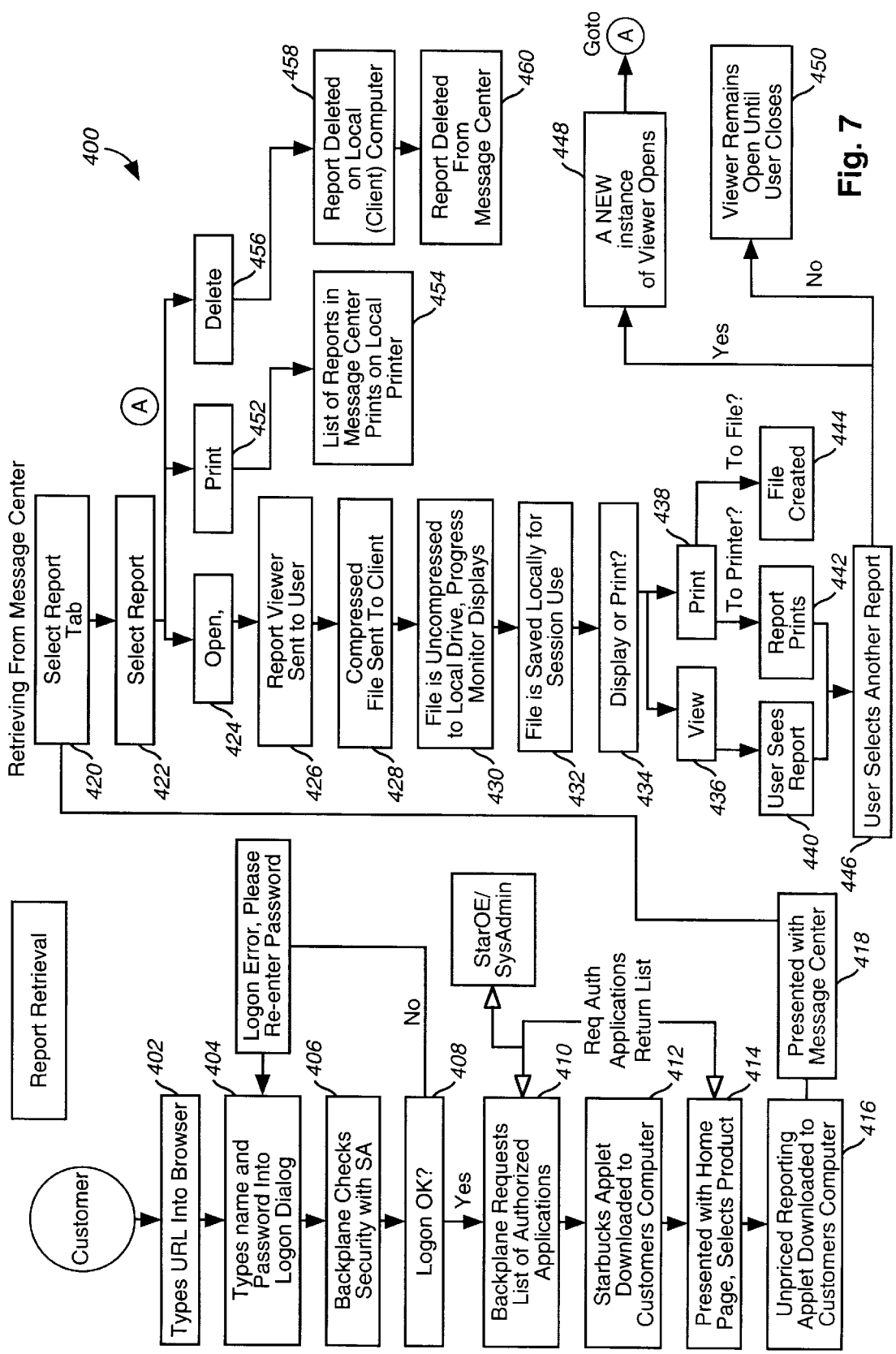
FIG. 7 is a flow diagram illustrating an overview of the report retrieval process utilizing the inbox system.

An overview of the report retrieval process utilizing the inbox system will now be described with references to the flow diagram of FIG. 7. In preliminary steps, a customer first establishes communication with the DMZ Web server at step 400 and logs on to the networkMCI Interact Platform by entering name and password on a logon dialog box as indicated at step 402. Then, at steps 406–408, an application running on the backplane directs a "validate user message" to the StarOE server via the web server and dispatcher servers to request the StarOE server to perform security validation and authenticate the name and password in the manner as described in co-pending U.S. patent application Ser. No. 09/159,408. Generally, the StarOE server is the repository of customer related security profile, pick lists and reporting entitlements.

Once the customer has logged on, the backplane requests a current list of authorized applications from StarOE by sending a "get user application request" message as indicated at step 410. The StarOE returns a response message comprising the list of authorized applications specific to the customer. As indicated at steps 412 to 418, this information is incorporated into the home page presented to the customer (FIG. 4). The customer may select either the message center (inbox) or one of the reporting icons to retrieve reports. In either case, to view reports, the customer makes the message center (inbox) the active window and selects the reports tab as indicated at step 420. As described previously, the report viewer interfaces with the customer's inbox (message center) for presenting to the customer the various types of reports received at the inbox. At steps 422, the customer may select open, print, or delete options for handling of reports. At step 424, if the customer selects the open option, the StarWRS viewer applet (report viewer) is launched as indicated at step 426. At step 428, the file transfer of the compressed file to the client computer begins. When the transfer is complete, the file may be automatically decompressed to a local drive as indicated at step 430 if the file is of a type which requires a report viewer. Additionally, depending on the file type, e.g., call detail data, the customer may be given an option to download but perform the decompressing at a later time. At step 432, the file is saved locally for session use, including displaying and printing. The customer is notified of the progress of the decompression by an indicator on the inbox window as shown at step 430. After the file is saved locally as indicated at step 432, the customer may view or print the downloaded file as indicated at steps 434 to 438. In addition, if the file type of the downloaded file is a report, as indicated by the metadata, a viewer may automatically be launched for displaying the report, whereby the customer is presented with the report at step 440. If the customer selects to print as indicated at step 438, the report, according to the customer's choice, is sent either to a printer associated with the customer's workstation at step 442 or to a local disk file named by the customer at step 444.

Moreover, various formats of the reports may be displayed depending on the type of service to which the report is directed. For example, a spreadsheet may be displayed with the report columns and corresponding data. FIG. 12 illustrates a sample spreadsheet 1200 display. This may be displayed as a splitframe and the other half may be a chart or graph based on the selected columns and fields. Default graphing, which automatically displays a graph according to the metadata instruction, is also supported. In addition, a mapping display may be used to support the reporting for the customer's network configuration. The customers may be able to see their sites, various connections between any two or more of these sites, and information about each specific site and circuit.

The StarWRS viewer applet remains open until the customer closes it as indicated at step 450. If the customer selects another report to view at step 446, the same process is begun and a new instance of the viewer opens on the screen at step 448. Other options available to the customer when a particular report is selected at step 422, are to print a list of reports in the inbox on a local printer as indicated at steps 452 to 454, and to delete the report both from the client platform and the inbox server as indicated at steps 456 to 460.

Generally, the inbox may be separated into three sections: News, Report, Data. Each of these sections retrieves files from the server. In addition, the Reports section may retrieve both a data file and a metadata file. The InboxCmd object is launched by the Inbox object when the customer requests a specific report and it utilizes the list transaction data to retrieve the proper information. Once the InboxCmd object retrieves the data file for the report selected, the customer may either save the file or continue with the processing. When the processing resumes, the program determines from the list transaction data whether the file needs to be decompressed. Once the data file has been processed, if the data file is a csv report file type, the InboxCmd object retrieves the metadata file. When all of the data regarding the selected report has been obtained by the InboxCmd object, it creates a new WRVReportViewer object, which launches one of the following viewers based upon the file type of the date file: WRVTableChartViewer, WRVTextViewer, WRVImageViewer.

The data file and metadata file are passed to the WRVController object, where the controller converts the data file into a WRVFileDataSource object and uses this object to create a WRVDataTable. The metadata file is placed in a WRVMetaData object which is then processed by the WRVMetaDataChecker object to prepare the data for extraction. The data is then taken from the processed metadata file and consolidated with the data file in the WRVDataTable. The consolidated WRVDataTable is used to produce the complete report. Further interaction with the inbox during the report generation and retrieval is described in the commonly owned co-pending U.S. patent application Ser. No. 09/159,684.

Additional Inbox Services

In addition to interfacing with the report viewer during the report retrieval and presentation process, the inbox server 302 supports additional types of services such as add, delete, list, fetch, and update items in the inbox by interoperating with the fulfilling servers 304a, 304b and the inbox client 300. The command "add" inbox item adds an item into the inbox. The data may comprise both short messages and large data transfers. It also supports optional paging or e-mail for an item that has been retrieved into the inbox. The add inbox item service is generally utilized by the application servers, i.e., the fulfilling servers and the report manager server, when report data or event notification data are available to be displayed at the client terminal. The application servers may utilize synchronous transaction for transferring files to the inbox. The data may also be transferred to the inbox via the FTP.

The user command "delete" an inbox item deletes any data related to the item selected at the client platform as well as the inbox server. The user command "list" inbox items for given customer provides a list of header information blocks pertaining to the inbox items. The user command "fetch" an inbox item returns data to the customer. The user command "update" an inbox item enables a customer to update fields such as purge days and acknowledgment flags. Table 1, given below, summarizes the inbox services, service requester, and types of transport mechanism which may be used for providing the services.

TABLE 1

| Service | Used by client platform applets | Used by application servers | Communica-tion transport mechanism |
|---|---|---|---|
| Add | No | Yes | Synchronous transaction |
| Delete | Yes | No | Synchronous |
| List | Yes | No | Bulk transfer |
| Fetch | Yes | No | Bulk transfer |
| Update | Yes | No | Synchronous transaction |

Generally, communication within the inbox server, inbox client, and application servers are accomplished by messaging interface. All the service requests to the inbox and all the responses comprise a list of parameters or other embedded lists. A simple list typically comprises of a series of "parameter=value" pairs separated by commas. The entire list is typically delimited by the "<" and ">" character. For example:

<parameter=value,parameter=value,parameter=value>

A value may be either a string delimited by double quotes using the conventional \ for escaping, long integer, or another list delimited by < and >. Additional un-parameterized binary data may be sent immediately following the list until the end of the data content of the transaction request or response. Thus, the general form of the data content may be:

<param=val,param=val,param=<param=val,param=val>, param=val binary-data Each of the services supported by the inbox and the corresponding request and response messaging interface will now be described in detail below.

Add Request from the Application Servers

The add request as described previously is performed by the inbox at the request of the StarOE, report manager, report scheduler, or any of the fulfilling servers, and typically adds an item into the inbox. The item includes the information about where the data is located. Table 2 below describes details of the messaging interface used when requesting the add service to the inbox server. An example of the request message may be:

A<CATEGORY=R,TYPE=Unpriced,USERID=1234,
   RPTID=245,
   COMPRESS=1,RPTCATEGORY=Longest Calls,
LOC=/inbox/files/TVs/38293738.txt,RQSTDT=
   199707211200,
   FSIZE=2048,RPTTITLE=My Longest Calls Report,
   MSIZE=1024>

When the inbox server receives and processes the request, it returns an acknowledgment of add in the format described in Table 3 shown below. An example of an acknowledgment response to add request may be:

Z<REQ=A,ERROR=0,INBOXID=528>

As mentioned previously, the fulfilling server placing an add request to the inbox performs the FTP of the report/data file to a known directory on the inbox server. This is a "push" from the fulfilling server to the inbox. A directory may be pre-defined on the inbox server for each application using the services of the inbox. The fulfilling server is generally responsible for the unique generation of file names within the application directory. The following directory and file naming conventions are generally utilized.

Directories on the inbox server:

| | |
|---|---|
| /inbox/files/tvs | TrafficView server |
| /inbox/files/sa | StarOE server |
| /inbox/files/hyper | Broadband server |
| /inbox/files/odsadm | ODS server |
| /inbox/files/rs | Report Scheduler |

The application (fulfilling) servers are responsible for generating unique file names within their directory on the inbox server. The fulfilling servers typically compress their report data files prior to FTP'ing into the inbox. The following file suffixes are generally used for uniformity.

| | |
|---|---|
| .txt | non-compressed text files |
| .txt_zip | compressed text files |
| .csv | non-compressed comma separated value files |
| .csv_zip | compressed comma separated value files |
| .gif | non-compressed image files |
| .gif_zip | compressed image files |

Typically, when the fulfilling servers places report result files in the inbox server, the fulfilling servers notify the report manager of the file placement, e.g., by sending a "notify report location" request to the report manager. The report manager verifies whether the request is valid and sends an Add request to the inbox after creating a file having the metatdata in the inbox, using the same file name as the report/data file, but with the following suffix.

| | |
|---|---|
| .mtd | metatdata file when results file is non-compressed |
| .mtd_zip | metatdata file when results file is compressed |

The "notify report location" message transaction is used by the fulfilling servers to notify the report manager of the location in the inbox of a scheduled report which has been made available for a customer. The "notify report location" is described in Table 4 shown below. An example of the "notify report location" message format may be:

NRL<TYPE=Unpriced,ENTPID=1234567,USERID= 1234,
STDRPTID=3434,USERRPTID=4321,REQUESTID= 39283,
COMPRESS=1,LOC=/inbox/files/TVs/39373928.txt, FSIZE=2048,PRESORTED=1,
TOTAL=<<21,100><32,401><37,700>>.

The report manager acknowledges the messages by sending the requesting server the "notify report location acknowledgment" message described in detail in Table 5 shown below. An example of this message format may be:

12345NRLA<ERRCOR=0,USERID=1234, USERRPTID=4321,REQUESTID=38 293>.

Add Request from the StarOE Application

Another example of an add request transaction may be from the StarOE server. As described in more detail in the co-pending U.S. patent application Ser. No. 09/159,408, StarOE is another horizontal service supported by the "networkMCI Interact" providing system administrative and order entry functionality for the application services. When a customer is added or more applications are made available to an existing customer, the StarOE application, at the end of its order entry process adds a news message welcoming the customer as well as the new subscription information to the inbox.

Figure 8:
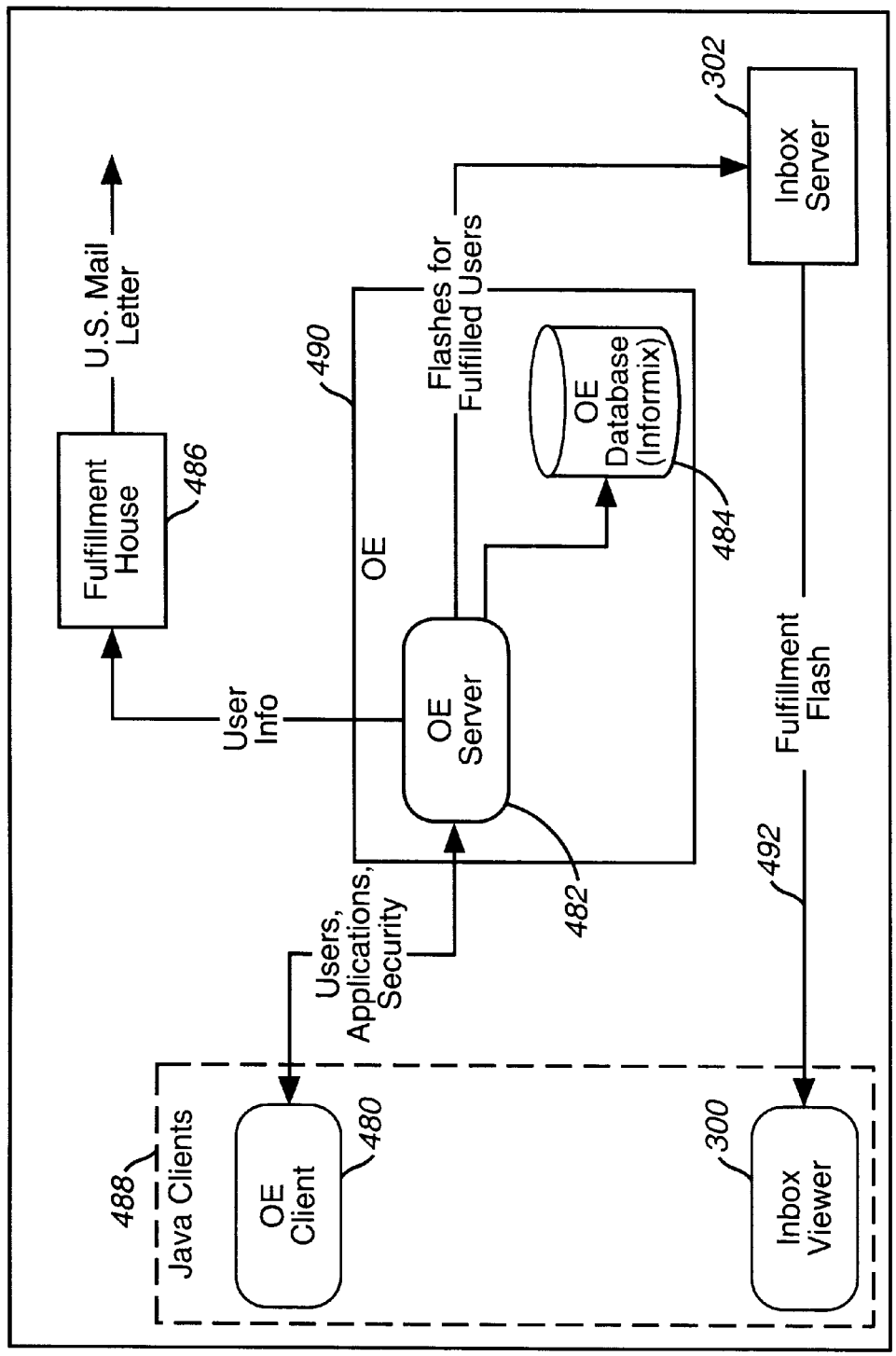
FIG. 8 illustrates an overview of the process in which the StarOE and the inbox interact during a customer order entry session.

FIG. 8 illustrates an overview of the process in which the StarOE and the inbox interact during customer order entry. Additions of new users or changes to information pertaining to existing users are typically performed via the OE client 480 and communicated to the OE server 482. The OE server 482, via its fulfillment process running periodically, sends information on new customers to a fulfillment house 48G which is responsible for sending new subscription packages to customers. The OE server 482 also sends a news message comprising welcome letters to each new customer to the Inbox server 302. If a new application is added to an existing customer then only a message to that effect is sent to the customer via the Inbox 302.

The fulfillment kit may comprise a welcome letter via conventional mail and/or an electronic inbox letter. The fulfillment process in the OE server 482 typically runs on a daily basis. The information needed for the fulfillment process is generally stored in an OE database 484, Sybase or Informix for example, in table forms. Such tables may include a user, configuration, and enterprise user application tables. The information or data is retrieved, configured and computed from the tables and put into a temporary fulfillment table which is used for the collection of the fulfillment information. From the fulfillment table the process creates the inbox letters and records for the fulfillment file. The enterprise user application table usually includes the status of whether the requested applications have been fulfilled. The fulfillment file is transferred, using file transfer protocol (FTP), for example, to the fulfillment group 486 for creation of the welcome letters. The welcome letter comprises the customer's id and password, URLs pointing to a language specific web page where a customer may typically start up the system of the present invention which the customer has ordered.

When the OE transmits the news messages for fulfilled customers, the inbox server notifies the inbox client 300 at the client platform 488. The notification is typically performed over secure socket connections 492. A customer, then typically views the messages displayed at the client terminal by the inbox client 300.

Requests from the Inbox Client

Figure 13:
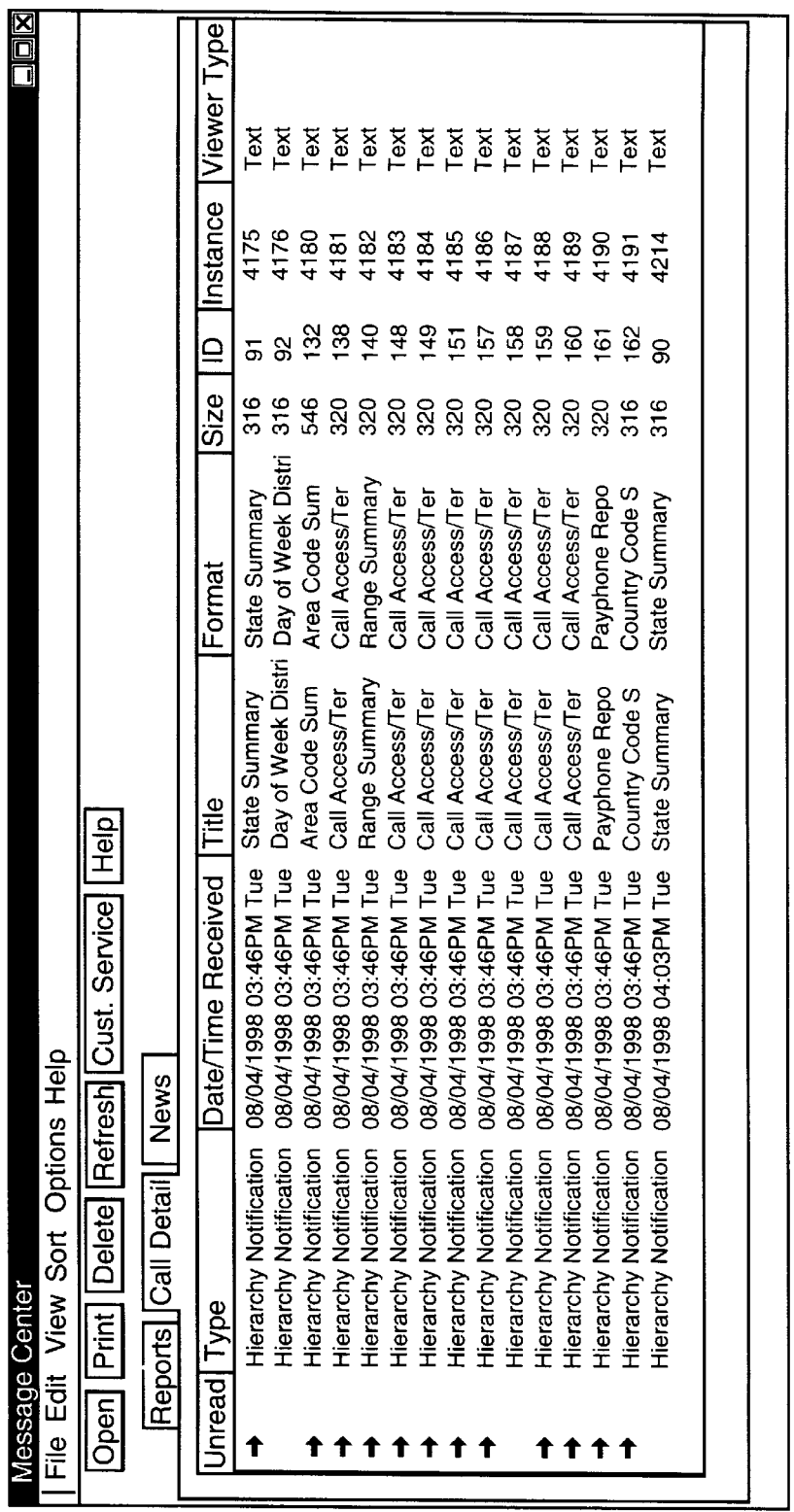
FIG. 13 illustrates an example of the inbox client screen display from which a customer may invoke various inbox services.

Referring back to the inbox services, the delete, list, fetch, and update item user commands are performed by the inbox server at the request of the inbox client when a customer selects the options at the client terminal. FIG. 13 illustrates an example of the inbox client screen display 1300 where a customer utilizes the inbox services by selecting one of the options available.

The delete item service removes a selected item from the inbox and deletes the report from the local disk as well. When a customer clicks on the "delete" button from the inbox screen, the InboxCmd object launches the DeleteDlg object. The DeleteDlg object tells the Communication object to send a Delete Message to the inbox server to delete a specific report. When the server receives the Delete Message from the client, it calls the stored procedure to remove the item. It returns a response Z, the request that was being made(D) and an error code. If no error occurred, the error code may be set to zero.

The message interfaces used for delete item request is described in Table 6 shown below. An example of a delete item request message format is: D<INBOXID=255>. The inbox server may respond to the inbox client with an acknowledgment as described in Table 7 of Appendix A. An example of a response may be: Z<REQ=D,ERROR=0>.

The delete all items service removes all items from the inbox for an enterprise and user id and deletes the associated reports from the local disk as well. An enterprise is an aggregation of individual corp ids. Enterprises may be created to conveniently manage the resources of a number of logically related corp ids, and may include an alphanumeric identifier assigned to a customer using the call by call routing service. A user id refers to an alphanumeric identifier assigned to a particular customer. The delete all items request and response messages are described in Tables 8 and 9 respectively. An example of delete all item message format sent by the inbox client may be:

D<USERID=1234,ENTPID=7383>.

An example of acknowledgment to the messages sent by the inbox server to the inbox client may be:

Z<REQ=D,ERROR=0>.

The inbox list service is a synchronous request for a list of all inbox items pertaining to a specific customer. When a customer selects the inbox from the browser or the toolbar (FIG. 4) and clicks on a list service from the inbox screen, the InboxCmd object launches the InitDlg object. The InitDlg object tells the Communication object to send a List Message to the server to retrieve a list of available reports. When the server receives the List Message from the client, it calls the stored procedure to get a list of the requested items. It returns a response Z, the request that was made(L), a list of the requested items, and an error code. If no error occurred, the error code may be set to zero. If an error occurred, no list may be returned. The stored procedures are a set of procedures interacting with the inbox server's database for accessing, i.e., adding, modifying and retrieving the data stored in the inbox database. An example list of the stored procedures used in the present invention and their functional descriptions are provided in Table 15.

The list request and response message transactions are described in Tables 10 and 11 respectively. An example of list request message format sent by the inbox client to the inbox server may comprise:

L<ENTPID=3839,USERID=1234,CATEGORY=R, INBOXID=255>

The inbox server may respond to the inbox client with an acknowledgment whose message format may be:

Z<REQ=L,ERROR=0,INBOXID=35,<Ack1, DataLocation1,
DateReceived1,DateRequested1,Compressed1, RptID1,
InboxID1,Metafilesize1,Priority1,ReportName1,
ReportTitle1,Size1,Ttl1,Type1><Ack2,DataLocation2, DataReceived2,DateRequested2,Compresssed2, RptID2,
InboxID2,Metafilesize2,Priority2,ReporName2,
ReportTitle2,Size2,Ttl2,type2>>.

The fetch service is invoked when a customer selects a report to view. In this instance, the InboxCmd object launches the RetrieveDlg object. The RetrieveDlg object tells the Communication object to send a Retrieve Message to the inbox server to retrieve the files related to this report. When the inbox server receives the Retrieve Message from the client, it calls the stored procedure to update the item. It returns a response Z, the request that was made, the requested item and an error code. If no error occurred, the error code may be set to zero. If an error occurred, the requested item may not be sent.

The inbox fetch service is a bulk transfer request, comprising the parameter list described in Table 12 below. An example of a fetch request message may comprise: F<INBOXID=39273,METADATA=0>. As a response the inbox server may bulk transfer the requested file to the inbox client.

The inbox update service is invoked when a customer selects the update button from the inbox display to update or change any customer specific report or data stored in the inbox. For example, when the customer opens an item in the Message Center (inbox) which has not been acknowledged, the InboxCmd object launches the UpdateDlg object. The UpdateDlg object tells the Communication object to send an Update Message to the inbox server to update the acknowledgment status. When the server receives the Update Message from the client, it calls the stored procedure to update the item. It returns a response Z, the request that was made(U), and an error code. If no error occurred, the error code may be set to zero.

Another example utilizing the update function of the inbox is an instance when a time-to-live value needs to be changed. Generally, each message transaction sent to the inbox server is tagged by the sender with a "time-to-live," which determines how long the message may remain in the inbox server. A process in the inbox server monitors all the messages for their expiration, and automatically removes the message files whose "time-to-live" have expired. Accordingly, when a customer selects the update button on the inbox screen display to update or change the time-to-live value, the InboxCmd object launches the UpdateDlg object. The UpdateDlg object tells the Communication Object to send an Update Message to the inbox server to update the time-to-live information. When the inbox server receives the Update Time to Live Message from the client, it calls the stored procedure to update the item. It returns a response Z, the request that was made, and an error code. If no error occurred, the error code may be set to zero.

The inbox update service is a synchronous request, comprising the parameter list described in Table 13 below. Examples of a parameter list for the update request message are:

U<ENTPID=3938,USERID=1234,TTL=63, CATEGORY=R> or

U<INBOXID=123493,ACK=1>.

The Inbox server responds to the inbox client with an acknowledgment whose parameter list is described in Table 14 below. Examples of the acknowledgment message may be:

Z<REQ=U,ERROR=0> or

Z<REQ=U,ERROR=0>.

The inbox server and proxy (302 and 302' at FIG. 6) provides error codes denoting any kind of error condition which may have occurred when processing the transaction requests. The error codes are embedded with the response transaction messages sent to the requesting clients and servers. These error codes are described in detail in Tables 15 and 16 below. Typically, a zero value for the error denotes successful and completed processing as requested.

News Portion of the Inbox

The news portion of the inbox generally includes messages for a given customer. An example of a news message was described previously in reference to the StarOE news message that was sent to the inbox as a result of adding new users or new applications for existing customers. Another example of a news message populated in the inbox may be an administrator's broadcast message to a given category of users. Once the message is submitted by the administrator, the message is typically populated in the customers' inbox within two minutes. Each news message includes a title, priority, message content, and type, the size of the message content being limited only by the specific system resources, associated with it. Example values for the type field include "welcome," indicating welcome letter, "info," "alert," and "maint." The values for the priority field include urgent (color coded in red), attention (yellow), and normal.

The administrator who created the message typically determines the priority, type, categories of users, title, and message content. The administrator may also set a future date and time for the messages to be populated in the inbox. In this instance, the messages are populated in the inbox no more than two minutes before the requested time and no later than two minutes after the requested time. The news messages may also be deleted before scheduled time, or changed by the creator, i.e., the administrator in the instant example. The scheduled time for the news messages which are queued may also be altered to indicate new scheduled time for population in the inbox.

Time to Live

As described previously, each message transaction sent to the inbox are tagged by the sender with a "time-to-live," which determines how long the message may remain in the inbox. A process in the inbox server monitors all the messages for their expiration, and automatically removes the message files whose "time-to-live" have expired. Moreover, a cron tab entry in the inbox server typically cycles through on a periodic basis and deletes any records marked for deletion. For example, an ad hoc customer report may typically be marked for deletion from the customer report table once the status indicates that the report has been completely download to the client workstation.

Furthermore, a customer may change the time-to-live parameters associated with their files according to the inbox category, i.e., news, report, data, from their default values. For example, the customer may optionally set the have news to be stored for 1 day before being deleted, reports for 5 days, and data for 30 days. All items received in the inbox under the news category, then may have their time-to-live set to 1 day. Similarly, all items received in the inbox under the reports and data may have their time-to-live set to 5 days and 30 days, respectively.

Inbox Logging

In addition, the inbox server and the proxy incorporates a logging function for logging entries such as the incoming requests, the outgoing responses, error codes from stored procedures of SQL execution when accessing a database, and fields returned by the stored procedures. The logging facility timestamps each entry, and also attaches the source file and line number of the statement issuing the logging.

Inbox Proxy

The inbox server delivers messages to customers in a priority order by utilizing the multithreading mechanism described above. At the option of the sender, inbox messages may generate a page or e-mail to the recipient if not downloaded within a specified time. The optional arrangement may be typically specified by the customer during the order entry process via the StarOE system and stored in a customer profile, and may be communicated to the inbox via one of the messaging interfaces. This page or e-mail would be requested of an external messaging system by the inbox server.

FIG. 14 illustrates a high level process flow for the inbox interacting with other systems.

Figure 9:
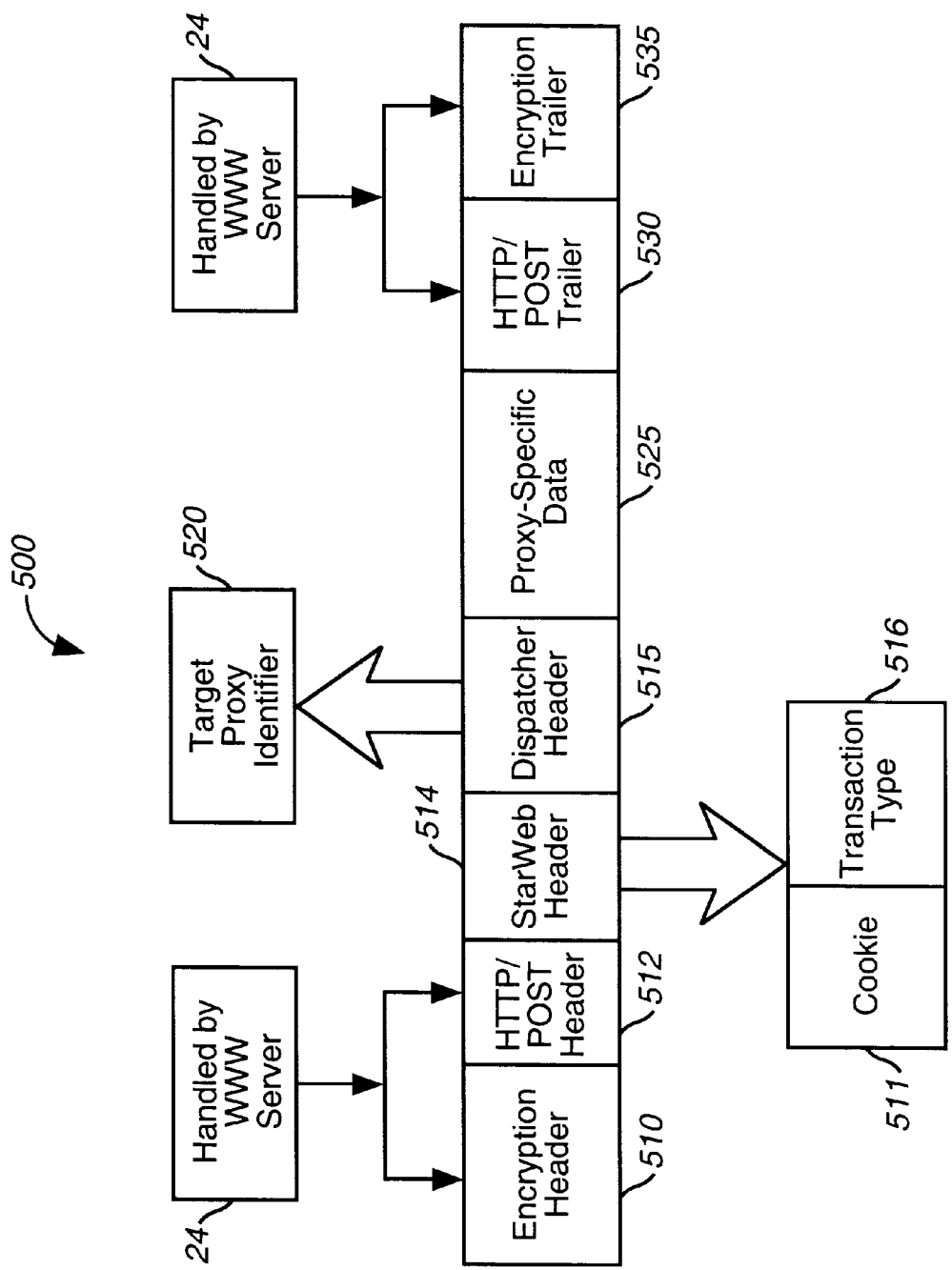
FIG. 9 illustrates a logical message format sent from the client browser to the desired middle tier server for a particular application.
Figure 10A:
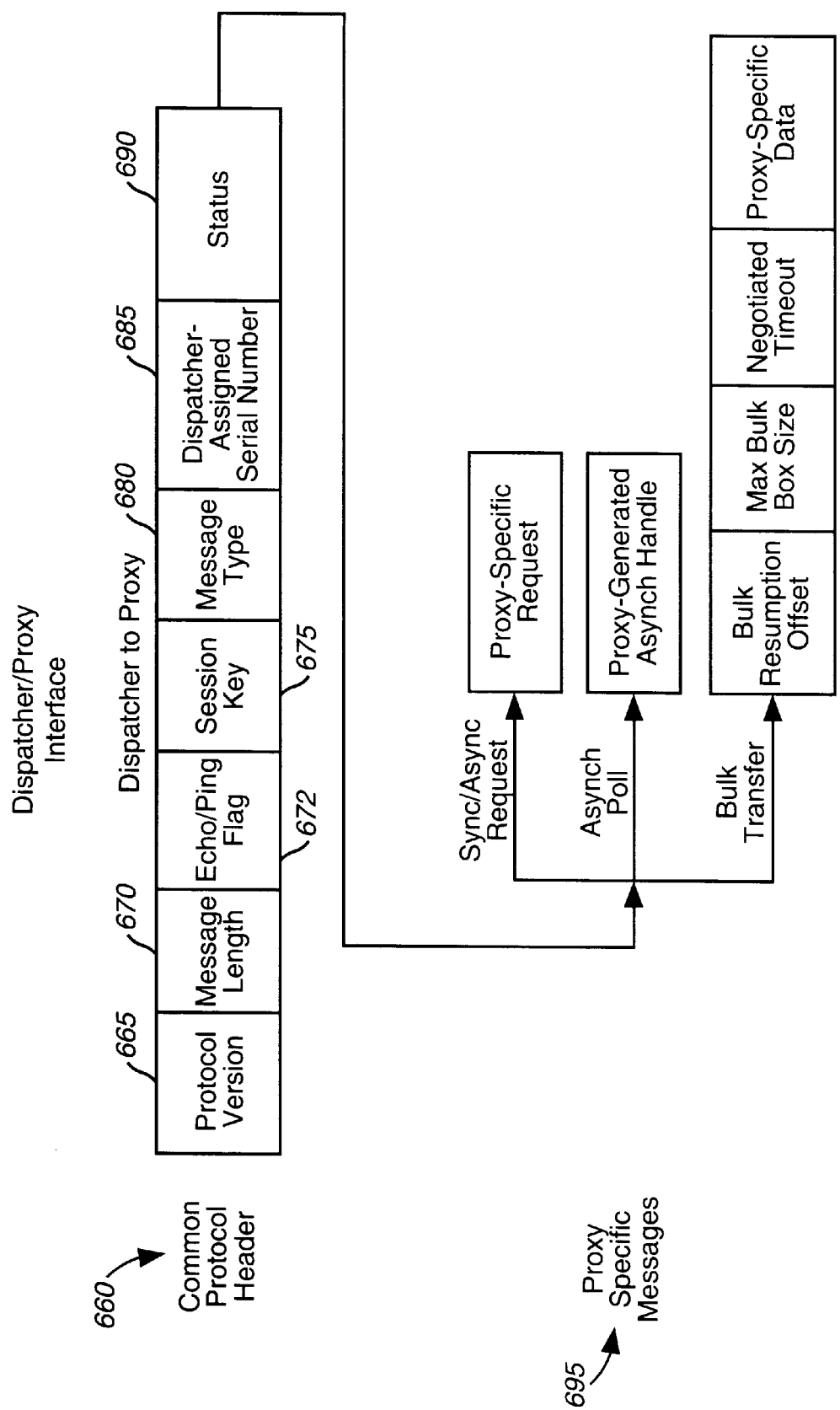
FIGS. 10(a) and 10(b) are schematic illustrations showing the message format passed between the dispatch server and the application specific proxy (FIG. 10(a)) and the message format passed between the application specific proxy back to the dispatch server (FIG. 10(b))

As mentioned herein with respect to FIG. 2(b), the messages created by the client Java software are transmitted to the StarWeb (DMZ) Server 24 over HTTPS. For incoming (client-to-server) communications, the DMZ Web servers 24 decrypt a request, authenticate and verify the session information. The logical message format from the client to the Web server is shown as follows:

∥ TCP/IP ∥ encryption ∥ http ∥ web header ∥ dispatcher header ∥ proxy-specific data ∥ where "∥" separates a logical protocol level, and protocols are nested from left to right. FIG. 9 illustrates a specific message sent from the client browser to the desired middle tier server for the particular application. As shown in FIG. 10(a), the client message 500 includes an SSL encryption header 510 and a network-level protocol HTTP/POST header 512 which are decrypted by the DMZ StarWeb Server(s) 24 to access the underlying message; a DMZ Web header 514 which is used to generate a cookie 511 and transaction type identifier 516 for managing the client/server session; a dispatcher header 515 which includes the target proxy identifier 520 associated with the particular type of transaction requested; proxy specific data 525 comprising the application specific metadata utilized by the target proxy to form the particular messages for the particular middle tier server providing a service; and, the network-level HTTP/POST trailer 530 and encryption trailer 535 which are also decrypted by the DMZ Web server layer 24.

After establishing that the request has come from a valid user and mapping the request to its associated session, the request is re-encrypted and then forwarded through the firewall 25 over a socket connection 23 to one or more decode/dispatch servers 26 located within the corporate Intranet 30 (FIG. 2(b)).

The messaging sent to the Dispatcher may include the user identifier and session information, the target proxy identifier, and the proxy specific data. The decode/dispatch server 26 decrypts the request and authenticates the user's access to the desired middle-tier service.

It should be understood that networking-level protocols and HTTP may be handled by off-the-shelf Web server software, e.g., Netscape Enterprise Server, or other Web Services-type cluster software that maintains a virtual client connection state. The "networkMCI Interact" DMZ Web services software may be invoked by the "networkMCI Interact" StarWeb server 24 using a POST-type mechanism, such as: a Netscape servlet API, CGI or equivalent.

As shown in FIG. 10(a), the StarWeb server 24 forwards the Dispatcher header and proxy-specific data to the Dispatcher, "enriched" with the identity of the user (and any other session-related information) as provided by the session data/cookie mapping, the target proxy identifier and the proxy-specific data. The dispatch server 26 receives the encrypted requests forwarded by the Web server(s) 24 and dispatches them to the appropriate application server proxies. Particularly, the messages are decrypted, and the wrappers are examined, revealing the user and the metadata-type service request. A first-level validation is performed, making sure that the user is entitled to communicate with the desired service. The user's entitlements in this regard would be fetched by the dispatch server 26 from StarOE server 482 at logon time and cached. Assuming that the requester is authorized to communicate with the target service, the message would be forwarded to the desired service's proxy.

Particularly, as explained generally above with respect to FIG. 6, the dispatch server 26 receives encrypted request messages forwarded by the DMZ Web servers and dispatches them to the appropriate server proxies. The messages are decrypted, and the wrappers are examined, revealing the user and the target middle-tier service for the request. A first-level validation is performed, making sure that the user is entitled to communicate with the desired service. The user's entitlements in this regard are fetched by the dispatch server from Order Entry server 482 at logon time and cached. Assuming that the requester is authorized to communicate with the target service, the message is then forwarded to the desired service's proxy, which, in the accordance with the principles described herein, is the inbox service proxy 302' corresponding to the inbox server 302. This proxy process further performs: a validation process for examining incoming requests and confirming that they include validly formatted messages for the service with acceptable parameters; a translation process for translating a message into the database query message or networking protocol; and, a management process for managing the communication of the specific customer request with the middle-tier server to actually get the request serviced. Data returned from the "networkMCI Interact"'s server is translated back to client format, if necessary, and returned to the dispatch server as a response to the request.

Figure 10B:
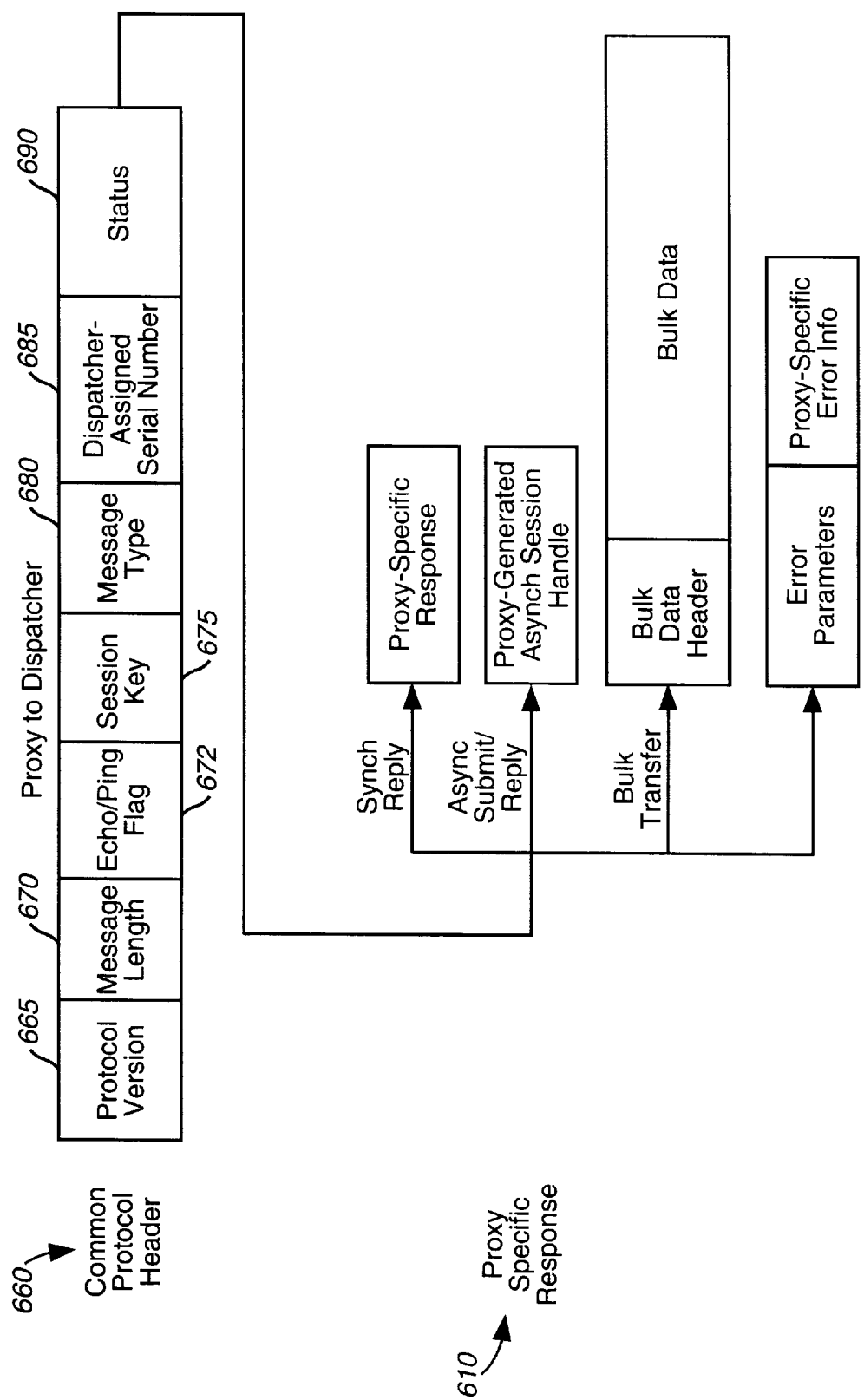

FIGS. 10(a) and 10(b) are schematic illustrations showing the message format passed between the Dispatcher 26 and the application specific proxy (FIG. 10(a)) and the message format passed between the application specific proxy back to the Dispatcher 26 (FIG. 10(b)). As shown in FIG. 10(a), all messages between the Dispatcher and the Proxies, in both directions, begin with a common header 660 to allow leverage of common code for processing the messages. A first portion of the header includes the protocol version 665 which may comprise a byte of data for identifying version control for the protocol, i.e., the message format itself, and is intended to prevent undesired mismatches in versions of the dispatcher and proxies. The next portion includes the message length 670 which, preferably, is a 32-bit integer providing the total length of the message including all headers. Next is the echo/ping flag portion 672 that is intended to support a connectivity test for the dispatcher-proxy connection. For example, when this flag is non-zero, the proxy immediately replies with an echo of the supplied header. There should be no attempt to connect to processes outside the proxy, e.g. the back-end application services. The next portion indicates the Session key 675 which is the unique session key or "cookie" returned by the Web browser and used to uniquely identify the session at the browser. As described above, since the communications middleware is capable of supporting four types of transport mechanisms, the next portion of the common protocol header indicates the message type/mechanism 680 which may be one of four values indicating one of the following four message mechanisms and types: 1)Synchronous transaction, e.g., a binary 0; 2) Asynchronous request, e.g., a binary 1; 3) Asynchronous poll/reply, e.g., a binary 2; 4) bulk transfer, e.g., a binary 3.

Additionally, the common protocol header section includes an indication of dispatcher-assigned serial number 685 that is unique across all dispatcher processes and needs to be coordinated across processes (like the Web cookie (see above)), and, further, is used to allow for failover and process migration and enable multiplexing control between the proxies and dispatcher, if desired. A field 690 indicates the status is unused in the request header but is used in the response header to indicate the success or failure of the requested transaction. More complete error data may be included in the specific error message returned. The status field 690 is included to maintain consistency between requests and replies. As shown in FIG. 10(*a*), the proxy specific messages 695 may be metadata message requests from a Report Requestor client (not shown) in the manner such as shown and described in co-pending U.S. patent application Ser. No. 09/159,684. Likewise, the proxy specific responses are metadata response messages 610 again, capable of being transmitted via a synch, asynch or bulk transfer transport mechanism.

It should be understood that the application server proxies may either reside on the dispatch server 26 itself, or, preferably, may reside on the middle-tier application server, i.e., the dispatcher front-end code may locate proxies resident on other servers.

As mentioned, each back-end service has a proxy process with three responsibilities: validate, translate, communicate. Validation comprises of parsing incoming requests, analyzing them, and confirming that they include validly formatted messages for the service with acceptable parameters. If necessary, the message is translated into an underlying message or networking protocol. If no errors in the message are found, the proxy then manages the communication with the middle-tier server to actually get the request serviced. The application proxy supports application specific translation and communication with the back-end application server for both the Web Server (java applet originated) messages and application server messages.

In performing the verification, translation and communication functions, the inbox proxy employs proxy.c, logfile.c, logfile.h, util.c, utils.h, protohdr.h, and oe_msg.h for supporting front-end functionality. The proxy.c file includes functions which listen on a socket for a message to arrive. When a message is received, a function in the proxy.c forks a process that is dedicated to the fulfillment of that message. The parent listens for an exit signal from the child, which is typically generated when the child completes its task and exits. The logfile.c includes the functions necessary for logging various events. If a file name is not passed as an argument in the command line, the proxy searches an initialization file for a default file name for logging events. The util.c file generally includes the functions necessary for socket implementation. The protohdr.h file includes definitions for the protocols which are needed when passing the messages.

To support the back-end functionality of the inbox system, the inbox proxy employs C++ tools such as: inboxutil.c, which file includes the functions for processing the inbox requests such as add, delete, list, fetch and update; inboxdef.h which is a header file included by the inboxutil.c comprising messages and definitions used by the inbox utility C code; MCIInboxParser.c which is a class used as a repository for the report manager metatdata, whose "build" member function reads the string comprising the data to store for the class to parse; MCIInboxParser.hh, a MCIInboxParser object holding public, private declarations of the MCIInboxParser.c; and mainsql.c, a class interfacing SQL C for messages from the report manager and report viewer, whose functions call the stored procedures according to the messages and build responses inside the functions depending on the returned values of the stored procedures. Typically, the MCIInboxParser object is created in inboxutil after a message has been received.

Other proxy functions and utilities provided include enabling multithreaded proxy functionality in order that the proxies may service multiple clients simultaneously. The logic flow diagram illustrating the multithreading functionality is shown in FIGS. 11(*a*)–11(*c*).

Figure 11A:
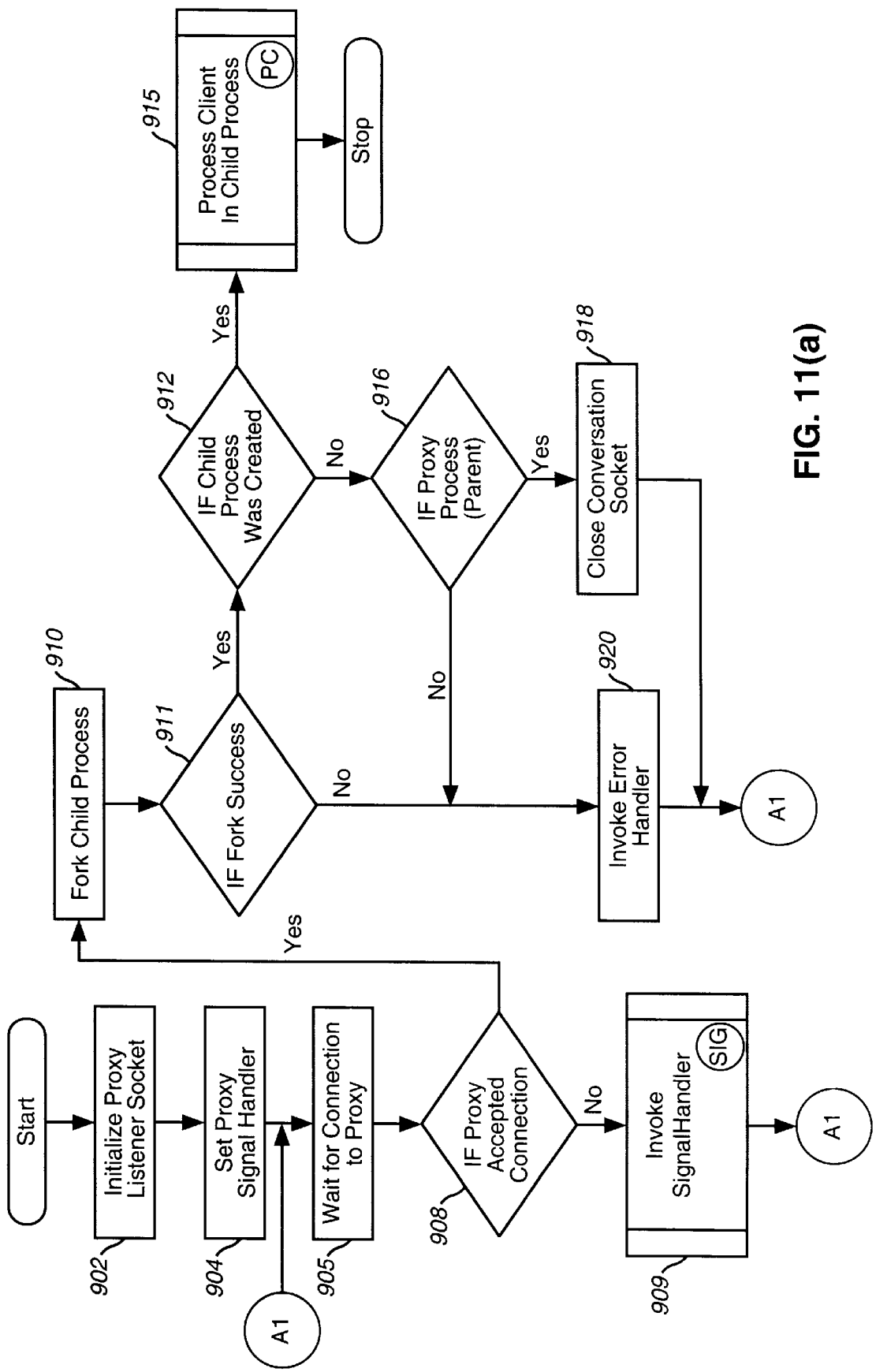
FIGS. 11(a), 11(b), and 11(c) illustrate a low level logic flow diagram depicting the multithreading functionality of the proxies.
Figure 11B:
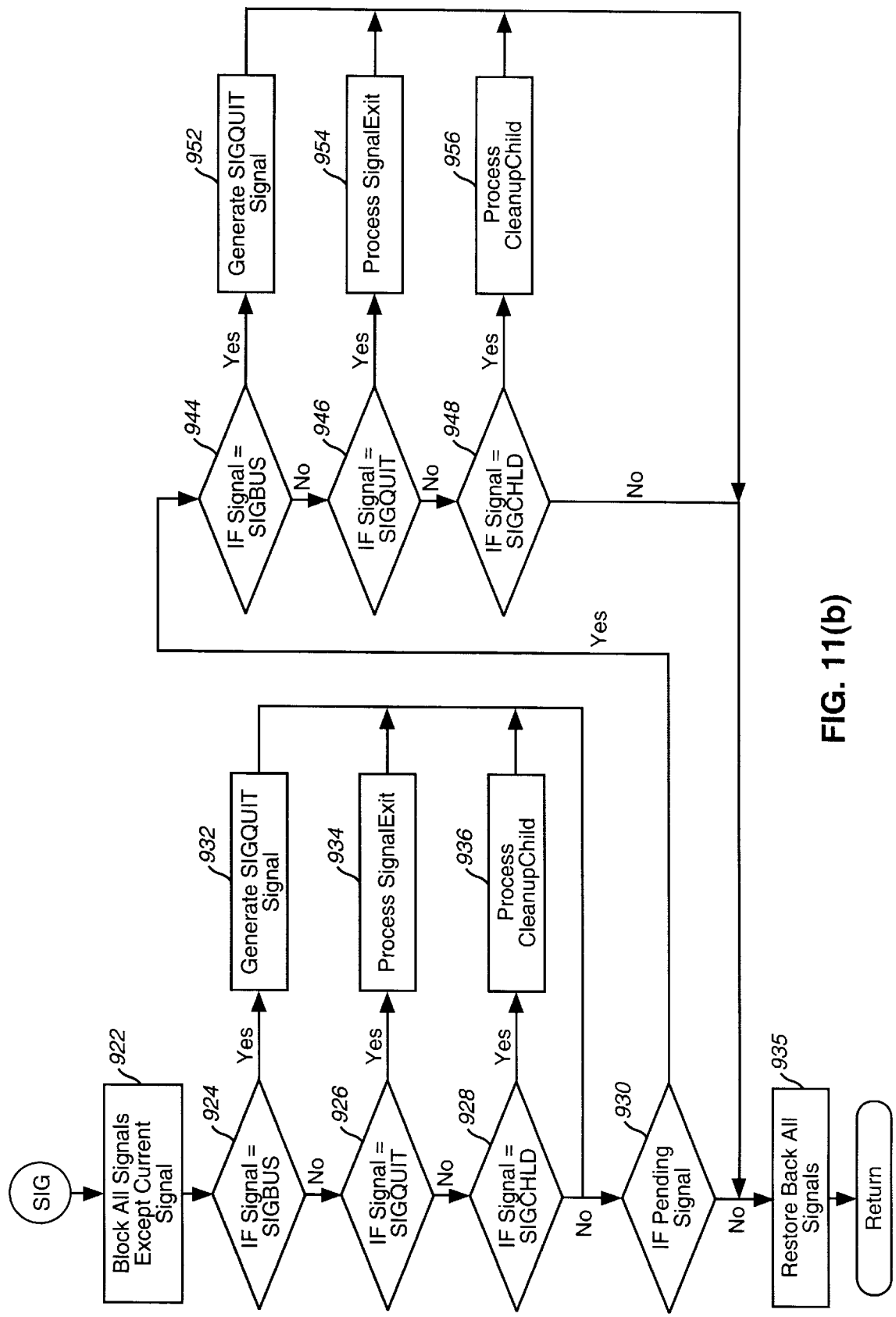
Figure 11C:
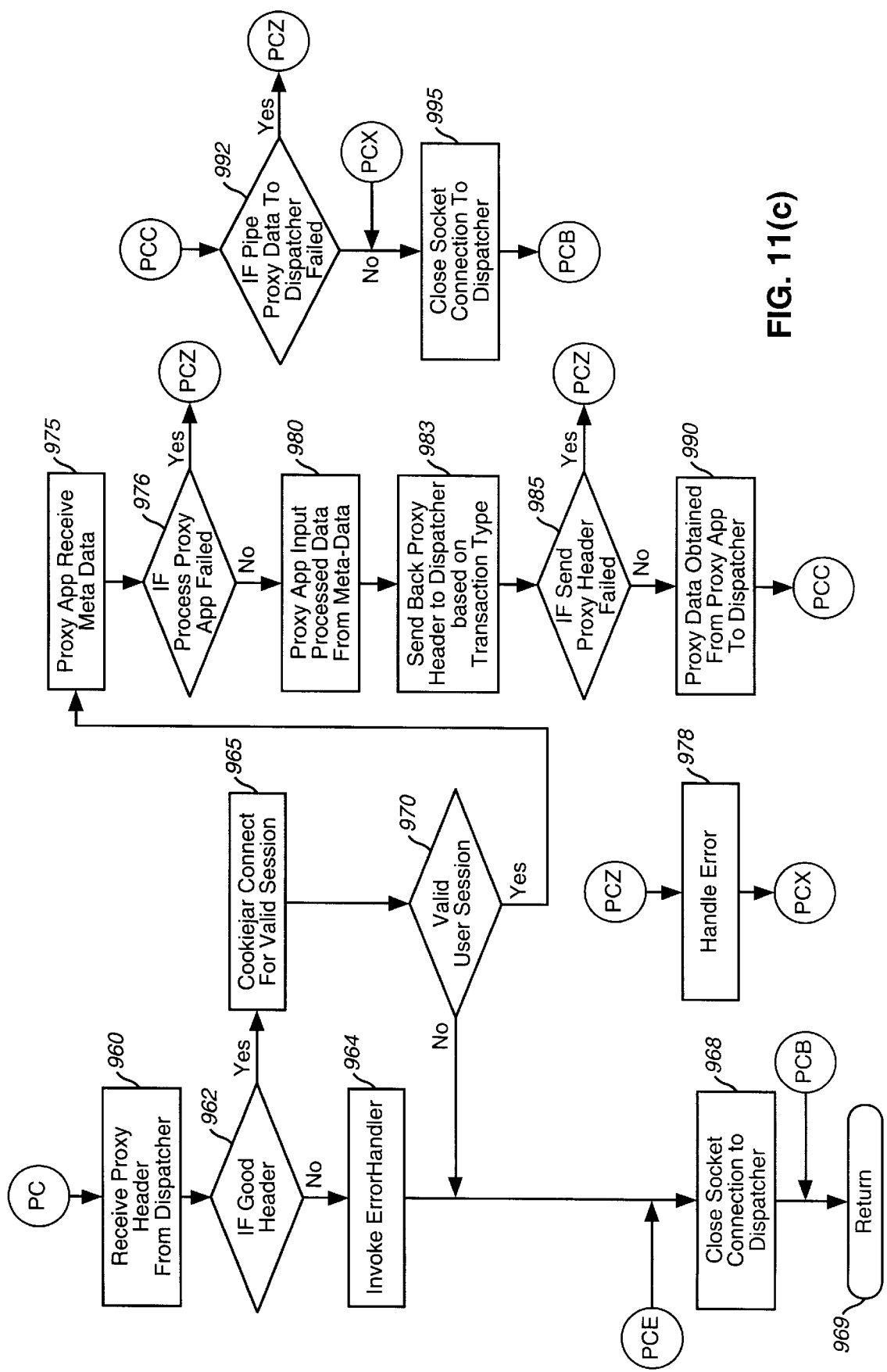

Specifically, as shown in FIG. 11(*a*), step 902, a proxy listener socket on a middle-tier server, e.g., inbox server, is first initialized. A proxy signal handler is invoked at step 904 to wait for a connection signal from the dispatcher server, as indicated at step 905. At step 908, a determination is made as to whether the Proxy has accepted a connection request from the dispatcher. If the proxy could not accept the connection, a SignalHandler Routine is invoked as indicated at step 909 and described with reference to FIG. 11(*b*). If the proxy accepts the connection, a child process is instantiated as indicated at step 910. A determination is next made at step 911 to determine if the forked process was successful. If the forked process was successful, then a check is made at step 912 to determine if the child process was created for that session. If the child process was created, then the child process is invoked at step 915 as described with reference to FIG. 11(*c*). If the child process was not created, a determination is made at step 916 to determine whether the parent proxy process is still executing. If the parent is still executing, then the current conversation socket is closed, as indicated at step 918, and the process returns to step 905. If the parent is not alive, then an error handler routine is invoked at step 920, and the process returns to step 905.

Returning back to step 908, if the proxy could not accept a connection request, the Signal Handler routine is described with reference to FIG. 11(*b*). As shown at step 922, the SignalHandler routine first blocks all signals except the current signal. Then at step 922 a determination is made at step 924 as to whether the received signal is equal to the SIGBUS indicating bus error. If the received signal is not equal to SIGBUS, then a determination is made at step 926 as to whether the received signal is equal to the SIGQUIT. If the received signal is not equal to SIGQUIT, then a determination is made at step 928 as to whether the received signal is equal to the SIGCHLD. If the received signal is not equal to SIGCHLD, then a determination is made at step 930 as to whether a signal is pending.

If, at step 924, it is determined that the received signal is equal to SIGBUS, then a SIGQUIT signal indicating that the process should exit, is generated at step 932, and the process returns to step 930. If, at step 926, it is determined that the received signal is equal to SIGQUIT, then a SignalExit process is invoked to exit as indicated at step 934, and the process returns to step 930. If, at step 928, it is determined that the received signal is equal to SIGCHLD, then a CleanupChild process is invoked to clear and reinitialize the child process procedures and terminate the child process as indicated at step 936, and the process returns to step 930. If none of these signals were generated and no signals are pending, then at step 935 all signals are restored and the process returns to step 905, FIG. 11(*a*).

If it is determined that a signal is pending at step 930, then the process proceeds to step 944. At step 944, a determination is made as to whether the received signal is equal to the SIGBUS indicating bus error. If the received signal is not equal to SIGBUS, then a determination is made at step 946 as to whether the received signal is equal to the SIGQUIT. If the received signal is not equal to SIGQUIT, then a determination is made at step 948 as to whether the received signal is equal to the SIGCHLD. If the received signal is not equal to SIGCHLD, then the process proceeds to step 935 where all signals are restored and the process returns to step 905, FIG. 11(*a*).

If, at step 944, it is determined that the received signal is equal to SIGBUS, then a SIGQUIT signal indicating that the process should exit is generated at step 952, and the process returns to step 935. If, at step 946, it is determined that the received signal is equal to SIGQUIT, then a SignalExit process is invoked to terminate the process as indicated at step 954, and the process returns to step 935. If, at step 948, it is determined that the received signal is equal to SIGCHLD, then a CleanupChild process is invoked to clear and reinitialize the child process local data and procedure as indicated at step 956, and the process returns to step 935. If none of these signals were generated, all signals are restored at step 935 and the process returns to step 905, FIG. 11(*a*).

Referring back to FIG. 11(*a*), the client request is processed by the forked child process as indicated at step 915. This procedure is described with reference to FIG. 11(*c*) where, at step 960, the proxy header is received from the Dispatcher. If the header does not conform to the protocol, then at step 964, an error handling routine is invoked, and the socket connection to the Dispatcher is closed, as indicated at step 968, and the process terminates by returning at step 969 to the invoking procedure (FIG. 11(*a*)). If the header conforms to the messaging protocol as determined at step 962, then a validation step is performed at step 965 wherein a connection to the Web server cookie jar is implemented to determine the validity of the current session. Next, a determination is made at step 970 as to whether the current session is a valid user session. If the current session is validated, then the process proceeds to step 975. Otherwise the process proceeds to step 968 to close the socket connection to the Dispatcher.

At step 975, FIG. 11(*c*), the proxy application receives the metadata message. At step 976, a determination is made as to whether the process proxy application failed. If the proxy process failed, the program handles the error as indicated at step 978. If there is no error, the proxy application inputs processed data from the meta data descriptions as indicated at step 980, and send back the proxy header to the Dispatcher based on the transaction type, as indicated at step 983.

A determination is made at step 985 as to whether an error occurs when sending the proxy header. If an error occurs, the program handles the error as indicated at step 987 and closes the socket connection to the dispatcher server as indicated at step 995. Otherwise, as indicated at step 990, the proxy data obtained from the proxy application is sent to the dispatcher in accordance with the specified transaction mechanism. A determination is made at step 992 as to whether an error occurs when sending the proxy data back to the Dispatcher server. If an error occurs, the program handles the error as indicated at step 978 and closes the socket connection to the dispatcher as indicated at step 995. If the transmission is successful, the socket connection to the Dispatcher server closes, as indicated at step 995 and the process returns to step 905, FIG. 11(*a*), to await the next proxy connection request.

Outgoing (server-to-client) communications follow the reverse route, i.e., the proxies feed responses to the decode/dispatch server, which encrypts the client-bound messages and communicates them to the DMZ Web servers over the socket connection. The Web servers forward the information to the client using SSL. The logical message format returned to the client from the middle tier service is shown as follows:

‖ TCP/IP ‖ encryption ‖ http ‖ web response ‖ dispatcher response ‖ proxy-specific response ‖ where "‖" separates a logical protocol level, and protocols nested from left to right.

TABLE 2

| Message | Parameter Name | Param Type | Required | Acceptable Value |
|---|---|---|---|---|
| A | Add request | Char (1) | Yes | A = add |
| CATEGORY = | Item category is an alarm, report, data, or flash | Char (1) | Yes | A = Alarm, R = Report, D = Data, F = Flash |
| TTL = | "time to live" in days before automatically purged from dbf | Char (3) | No | Default is 45 days |
| TYPE = | Designates alarm type, report type, data type, or flash type | Char (30) | Yes | e.g. Broadband, priced, unpriced, exception, invoice, MIR, CCID, priced call detail, outage |
| ENTPID = | Enterprise ID | Char (8) | Yes | As assigned in StarOE |
| USERID = | Designates intended recipient or audience | Char (20) | Yes | Starbucks username as assigned in Sys Admin |
| RPTID = | User report ID | Char (30) | Reports and data only | User report ID (i.e., 245) |
| PRIORITY = | Standardized Network Management Priority Levels | Char (1) | ONLY alarm or flash | 1 = fatal, 2 = major, 3= minor, 4 = info (default), 5 = no alert |
| COMPRESS = | Designates whether the data has been compressed | Char (1) | Yes | 0 = data not compressed, 1 = data compressed |
| UNOTIFY = | Says if user should be paged or emailed when the inbox item is received by the Inbox server | Char (1) | No | 0 = None (default), 1 = Page, 2 = Email, 3 = Email and page |
| MMADDR | Override email address | Char(75) | No | Must contain @ e.g. userA @ mci.com |
| MMTEXT | Override email message text | Char(500) | No | |

TABLE 2-continued

| Message | Parameter Name | Param Type | Required | Acceptable Value |
|---|---|---|---|---|
| PGT | Override pager type | Char(1) | No | As supported by Star_OE |
| PGPIN | Override pager PIN | Char(8) | No | Numerics only |
| PGTXT | Override pager text | Char(240) or Char(20) | No | Alphanumeric pagers or Numeric pagers 1, 2, or 3 |
| SEV = | Servity of notification message | Char (1) | No |  |
| RPTCATEGORY = | Report category (report name) | Char (50) | ONLY report | e.g. - Longest Calls |
| LOC = | Location | Char (255) | Yes | File Path, name and extension |
| RQSTDT = | Report or data request date/time stamp | Char (12) | ONLY report or data | YYYY-MM-DD HH:MM |
| FSIZE = | Size of associated file in bytes | Char (10) | Yes | Limit is 2147483647 |
| RPTTITLE = | Alarm short test, user-defined report title, data request name, or flash short text | Char (255) | Yes |  |
| MSIZE = | Size of associated metadata for transfer | Char (10) | ONLY report or data | Limit is 2147483647 |
| ERRFLAG = | Fulfilling server reported an error | Char (1) | No | 0 = no error (default), 1 = error |

TABLE 3

| Message | Parameter Name | Param Type | Required | Acceptable Value |
|---|---|---|---|---|
| Z | Reponse | Char (1) | Yes | Z |
| REQ = | Request which is being acknowledged | Char (1) | Yes | A, D, L, F, U |
| ERROR = | Error Code | Char | Yes | 0 = no error or error code |
| INBOXID = | Inbox ID | Char(10) | No | Uniquely assigned id |

TABLE 4

| Message | Parameter Name | Param Type | Required | Acceptable Value |
|---|---|---|---|---|
| NRL | Request | Char (3) | Yes |  |
| CATEGORY = | Alarm, report data, or flash | Char (1) | Yes for StarOE. Report Manager will determine for fulfilling servers. | A = Alarm, R = Report, D = Data, F = Flash |
| TYPE = | Designates alarm type, report type, data type, or flash type | Char (30) | Yes | e.g. Broadband, priced, real-time, exception, invoice, MIR, CCID, priced call detail, outage |
| ENTPID = | Enterprise ID | Char (8) | Yes | Enterprise ID |
| USERID = | User's ID | Char (20) | Yes | UserID |
| STDRPTID = | Standard Report ID | Char (10) | Yes | Standard Report ID (i.e.. 2, 44). |
| USERRPTID = | User Report ID | Char (10) | Yes when fulfilling server is using the StarWRS Report Requester | User Report ID (i.e., 245). Limit on unique user report ids is 2147483647 |
| REQUESTID = | Unique Request ID | Char (10) | Yes when fulfilling server is using the StarWRS Report Requester | Unique request ID sent to fulfilling server in ARD. Limit on request ID is 2147483647. |
| PRIORITY = | Standardized Network Management Priority Levels | Char (1) | ONLY alarm or flash | 1 = fatal, 2 = major, 3 = minor, 4 = info (default), 5 = no alert = |
| COMPRESS = | Designates whether the data has been compressed | Char (1) | Yes | data not compressed, 1 = data compressed |
| LOC = | Location | Char (255) | Yes | File Path, name and extension |
| FSIZE = | Size of associated file in bytes | Char (10) | Yes | Limit is 2147483647 |
| REPORTTITLE = | Report Title | Char (100) | Yes when fulfilling server is not using the StarWRS Report Requester | Report title to be displayed in Inbox. |
| PRESORTED = | Indicates whether or not the fulfilling server sorted the data on their side. | Char (1) | Yes | 0 = not pre-sorted, 1 = is presorted. |
| ERR = | Used to when there is no report file, but there is an informational file | Char (1) | No | ERR = 1 |
| TOTAL = | Fulfilling server totals | Char | No | Sent by fulfilling server to indicate report totals. Column ID and total are passed |

TABLE 5

Notify Report Location Acknowledgement

| Message | Parameter Name | Param Type | Required | Acceptable Value |
|---|---|---|---|---|
| NRLA | Response | Char (4) | Yes | |
| ERROR = | Error Code | Char (4) | Yes | 0 or error |
| USERID = | User ID | Char (20) | Yes | User ID |
| USERRPTID = | User Report ID | Char (10) | Yes | User Report ID (i.e., 245). Limit on unique user report Ids is 2147483647 |
| REQUESTID = | Unique Request ID | Char (10) | Yes when fulfilling server is using the StarWRS Report Requester | Unique request ID sent to fulfilling server in ARD. Limit on request ID is 2147483647. |

TABLE 6

Delete Item

| Message | Parameter Name | Param Type | Required | Acceptable Value |
|---|---|---|---|---|
| D | Request | Char (1) | Yes | D = Delete |
| INBOXID = | Unique Inbox ID | Char(10) | Yes | ID assigned by Inbox to uniquely identify the item to be deleted |

TABLE 7

Delete Acknowledgment

| Message | Parameter Name | Param Type | Required | Acceptable Value |
|---|---|---|---|---|
| Z | Response | Char (1) | Yes | Z |
| REQ = | Request which is being acknowledged | Char (1) | Yes | D |
| ERROR = | Error Code | Char(4) | Yes | 0 = no error, else error code |

TABLE 8

Delete All Items

| Message | Parameter Name | Param Type | Required | Acceptable Value |
|---|---|---|---|---|
| D | Request | Char (1) | Yes | D = Delete |
| USERID = | User ID | Char (20) | Yes | User ID |
| ENTPID = | Enterprise ID | Char (8) | Yes | Enterprise ID |

TABLE 9

Delete Acknowledgment

| Message | Parameter Name | Param Type | Required | Acceptable Value |
|---|---|---|---|---|
| Z | Response | Char (1) | Yes | Z |
| REQ = | Request which is being acknowledged | Char (1) | Yes | D |
| ERROR = | Error Code | Char (4) | Yes | 0 = no error, else error code |

TABLE 10

List

| Message | Parameter Name | Param Type | Required | Acceptable Value |
|---|---|---|---|---|
| L | Request | Char (1) | Yes | L = List |
| ENTPID = | Enterprise ID | Char (8) | Yes | Enterprise ID |
| USERID = | User ID owning item | Char (20) | Yes | As assigned by Sys Admin |
| CATEGORY = | Inbox item category to return | Char (1) | Yes | A = Alarm, R = Report, D-Data, F = Flash |
| INBOXID = | Latest Inbox ID in Inbox | Char (25) | No | Inbox Id to return entries later than |

TABLE 11

List Acknowledgment

| Message | Parameter Name | Param Type | Required | Acceptable Value |
|---|---|---|---|---|
| Z | Response | Char (1) | Yes | Z |
| REQ = | Request which is being acknowledged | Char (1) | Yes | L |
| ERROR = | Error Code | Char(4) | Yes | 0 - no error, else error code |
| INBOXID <data> | Latest Inbox ID requested | Char (25) | No | Supplied Inbox ID on request |

TABLE 12

Fetch

| Message | Parameter Name | Param Type | Required | Acceptable Value |
|---|---|---|---|---|
| F | Request | Char (1) | Yes | F = Fetch |
| INBOXID = | ID assigned by inbox to uniquely identify the item to be located | Char | Yes | |

TABLE 12-continued

Fetch

| Message | Parameter Name | Param Type | Required | Acceptable Value |
|---|---|---|---|---|
| METADATA = | Flag indicating request for file size or metadata file size | Char (1) | Yes | 0 = File<br>1 = Metadata File |

TABLE 13

Update

| Message | Parameter Name | Param Type | Required | Acceptable Value |
|---|---|---|---|---|
| U | Operation flag-update request | Char (1) | Yes | U = Update |
| ENTPID= | Enterprise ID | Char (8) | Yes | Enterprise ID |
| USERID= | User ID owning item | Char (20) | Yes | As assigned by Sys Admin |
| INBOXID= | Inbox unique ID | Char () | Yes | ID assigned by Inbox to uniquely identify the item to be located |
| TTL= | Time to Live | Char (3) | No | "Time to live" in days-before automatically purged from dbf. Default is 45 days. |
| ACK= | Acknowledge | Char (1) | No | 0 = not acknowledged<br>1 = acknowledge item (default) |

TABLE 14

Update Acknowledgment

| Message | Parameter Name | Param Type | Required | Acceptable Value |
|---|---|---|---|---|
| Z | Request | Char (1) | Yes | Z |
| REQ= | Request which is being acknowledged | Char (1) | Yes | U |
| ERROR= | Error Code | Long | Yes | 0-no error, else error code |

TABLE 15

Inbox Stored Procedure Codes

| Error Code | Error Description |
|---|---|
| 0 | OK-request processed successful, response includes any data requested |
| 5000 | Stored procedure "db_in_del" (status code). Inbox ID does not exist. |
| 5010 | Stored procedure "db_in_updttl" (error code). Exception in stored procedure. |
| 5011 obsolete | Stored procedure "db_in_updttl" (status code). No instances of requested Category and User ID exists. |
| 5020 | Stored procedure "db_in_additem". Failure in insert |
| 5030 | Stored procedure "db_in_updack" (status code). Inbox ID does not exist in the Inbox table. |
| 5031 | Stored procedure "db_in_updack". Exception in stored procedure. |
| 5032 | Stored procedure "db_in_getttl". Exception in stored procedure. |
| 5040 | Stored procedure "db_in_list". Exception in stored procedure. |
| 5050 | Stored procedure "db_in_autopurge". Failure deleting from Inbox. |
| 5060 | Stored procedure "db_in_fetch". Exception in stored procedure. |
| 5070 | Stored procedure "db_in_count". Exception in stored procedure while selecting. |
| 5080 | Stored procedure "db_in_del". Exception in stored procedure. |
| 5090 | Stored procedure "db_in_addretry". Exception in stored procedure. |
| 5120 | Stored procedure "db_in_deluser". Exception in stored procedure. |
| 5125 | Stored procedure "db_in_deluser". Inbox row does not exist. |
| 5130 | Stored procedure "db_in_talqueue". Exception in stored procedure. |
| 5133 | Stored procedure "db_in_taldone". Exception in stored procedure. |
| 5134 | Stored procedure "db_in_tallost". Exception in stored procedure. |
| 5135 | Stored procedure "db_in_taldone". No such Intalq table. |
| 5136 | Stored procedure "db_in_tallost". No entry in Process processing state and older than the given date. |
| 5500 | Stored procedure "db_in_addmail". Exception in stored procedure. |
| 5505 | Stored procedure "db_in_addpage". Failure in insert. |
| 5531 | Stored procedure "db_in_talnext". Exception in stored procedure. |
| 5532 | Stored procedure "db_in_talnext". No entry in ready processing state. |

TABLE 16

Inbox Proxy Codes

| Error Code | Error Description |
|---|---|
| 0 | OK-request processed successful, response includes any data requested |
| 5005 | item had already been added to the inbox and will not be added again. |
| 5100 | No reeords found (status code). |
| 5101 | Failure in parser building parameter list, unknown or invalid token may have been encountered. |
| 5102 | Required parameter missing |
| 5103 | Request is invalid or unknown. |
| 5104 | During Fetch request, the file specified in the Inbox database could not be opened |
| 5105 | Could not make an SQL connection to the Inbox database |
| 5106 | Error occurred trying to execute the stored procedure |
| 5107 | Error occurred during an SQL open cursor call |
| 5108 | Error occurred trying to construct the filename for a Fetch metadata request |
| 5111 | Parameter (Inboxid or Userid) missing on update command. |
| 5112 | TTL missing or invalid on Update |
| 5113 | Category missing on Update. |
| 5121 | InboxID parameter missing in Fetch. |
| 5125 | no records found for deletion by stored procedure |
| 5131 | UserID parameter missing in List. |
| 5132 | Category missing in List. |
| 5141 | UserID parameter missing in Delete. |
| 5151 | Category parameter invalid in Add. |
| 5152 | Type parameter invalid in Add. |
| 5153 | EntpID+UserID parameter missing or invalid in Add. |
| 5154 | RptID parameter missing in Add. |
| 5155 | Compress parameter missing in Add. |
| 5156 | Sev parameter missing when Unotify specified in Add. |
| 5157 | RptCategory (report name) parameter missing in Add. |
| 5158 | Loc parameter missing in Add. |
| 5159 | Requested date parameter missing in Add. |
| 5160 | Fsize parameter missing in Add. |
| 5161 | RptTitle parameter missing in Add. |
| 5162 | Msize parameter missing in Add for Report or Data. |
| 5163 | File as specified in Loc parameter does not exist. |
| 5164 | EntpID parameter missing when Unotify specified. |
| 5165 | COMP and LOC parameters conflict, e.g. compress indicated but extension does not end with_zip. |
| 5166 | metadata file does not exist. |
| 5170 | User notification error-used in conjunction with 5171, 5172, 5174 |
| 5171 | No user or enterprise ID in user notification |
| 5172 | Notification level is null |
| 5174 | Unknown notification level |
| 5178 | Invalid constructor call in user notification |
| 5179 | Invalid email address (no @ symbol) in user notification |
| 5180 | No address or text exists in user notification for email |
| 5182 | Page could not be sent-required fields missing in user notification |
| 5183 | Comm failure in trying to obtain default email/paging info |
| 5184 | StarOE returned an error when trying to obtain default email/paging info |
| 5185 | Error when attempting to fork a child process in email/paging |

While the invention has been particularly shown and described with respect to preferred embodiments thereof, it will be understood by those skilled in the art that the foregoing and other changes in form and details may be made therein without departing from the spirit and scope of the invention.

What is claimed is:

1. A centralized inbox system for providing on-line reporting, presentation, and notifications to a client workstation from one or more Intranet application services over an Internet/Intranet network, the system comprising:

a client browser application located at the client workstation for enabling interactive web-based communications with the inbox system and providing an integrated interface to the one or more Intranet application services, the client workstation identified with a customer, the client browser application further including an inbox client, the inbox client launched by the client browser application;

at least one secure server for managing client sessions over the Internet/Intranet network, the secure server supporting one or more first secure socket connections enabling encrypted communication between the client browser application and the secure server;

one or more application servers associated with the one or more Intranet application services, the application servers generating customer specific data for forwarding;

an inbox server for storing and maintaining the customer specific data, the data including report data and notification data received from the one or more Intranet application servers, the inbox server also storing a metadata description of the report data, the metadata representing report standards and options for customizing the report standards, wherein the report data and the metadata associated with the report data may be downloaded to the client browser application via the secure server for generation of reports according to the metatdata description, and presentation of the reports to the customer at the client workstation; and the inbox server further storing a notification alert received from the one or more application servers for enabling the inbox client to retrieve and present the notification alert to the customer at the client workstation.

2. The system as claimed in claim 1, wherein the inbox client further includes a polling thread, the polling thread using one of the secure socket connections for detecting an incoming message from the inbox server via the secure server, the polling thread further starting a new thread upon detection of the incoming message, wherein the new thread starts and listens on a second one of the secure socket connections for detecting new messages, while the polling thread receives the incoming message on the first one of the secure socket connection, whereby multiple messages may be downloaded simultaneously as detected.

3. The system as claimed in claim 2, wherein the inbox client further communicates to the client browser application to launch a client application service associated with the notification alert when the customer selects the notification alert presented at the client workstation.

4. The system as claimed in claim 2, wherein the inbox client further comprises a control device for upgrading and downloading of client applications, the client applications including the client browser application.

5. The system as claimed in claim 2, wherein the inbox server further comprises a pre-defined directory associated with each of the one or more Intranet application services, wherein each of the one or more application servers stores the report data and the notification data to its respective pre-defined directory in the inbox server.

6. The system as claimed in claim 2, wherein the inbox server utilizes a database storage and retrieval system for storing and retrieving the customer specific data.

7. The system as claimed in claim 2, wherein the system further includes an order entry server and, wherein the notification alert includes a news message from the order entry server upon addition of a new customer to the system, and the notification data includes a welcome message and a new subscription package for the new customer.

8. The system as claimed in claim 2, wherein the notification alert comprises an indication for error condition, and the notification data comprises an error message associated with the error condition.

9. The system as claimed in claim 2, wherein the customer specific data includes a time-to-live tag for representing the duration of time the customer specific data remains stored in the inbox server, the inbox server further comprising a device for detecting and deleting the customer specific data whose time-to-live tag has expired, wherein said device for detecting and deleting removes from the inbox server the customer specific data whose time-to-live has expired.

10. The system as claimed in claim 2, wherein the inbox server further comprises:

a device for marking the customer specific data for deletion;

a device for deleting the customer specific data, wherein the device for deleting runs periodically and deletes marked records for deletion.

11. The system as claimed in claim 2, wherein the inbox server further comprises a device for generating a paging message to the customer when the notification data associated with the notification alert is received.

12. The system as claimed in claim 2, wherein the inbox server further comprises a device for generating an e-mail message to the customer when the notification data associated with the notification alert is received.

13. The system as claimed in claim 2, wherein the inbox server further comprises a device for logging information related to the data received by the inbox server.

14. The system as claimed in claim 13, wherein the device for logging logs error codes occurring during processing of the inbox server.

15. The system as claimed in claim 14, wherein the device for logging records date and time of occurrence of an error.

16. The system as claimed in claim 2, wherein the inbox client further comprises a graphical user interface common to the integrated interface, and the inbox client presents a list of available reports to the customer via the graphical user interface.

17. The system as claimed in claim 16, wherein the graphical user interface presents to the customer a choice of options for fetching, and deleting the customer specific data stored in the inbox server, wherein when the customer selects an option, the inbox client formulates and sends a request message to the inbox server via the secure server.

18. The system as claimed in claim 16, wherein the inbox client is implemented as an applet launched from a Web browser window.

19. The system as claimed in claim 16, wherein the inbox client is implemented independently from a Web browser window, and wherein the inbox client runs in a frame outside of the Web browser window.

20. A method of providing on-line reporting, presentation, and notifications to a client workstation from one or more Intranet application services over an Internet/Intranet network, the method comprising:

enabling interactive Web-based communications between the client workstation having a client browser application, the client workstation identified with a customer, and a secure server over one or more secure socket connections, the secure socket connection enabling encrypted communication between the client browser application and the secure server;

receiving at a centralized inbox server, customer specific data, including report data having a metadata description for representing report standards and options for customizing the report standards, and notification data from the one or more Intranet application services;

storing and maintaining the report data and notification data at the centralized inbox server, wherein the report data may be downloaded to the client browser application via the secure server for generation of reports according to the metadata description, and presentation of the reports to the customer at the client workstation;

generating notification alerts from the notification data as received from the one or more Intranet application services; and presenting the notification alert to the customer at the client workstation.

21. The method according to claim 20, wherein the method further comprises:

(a) listening for an incoming message on a first of the one or more secure socket connections, and when the incoming message is detected, (i) starting a new thread and a second of the one or more secure socket connections;

(ii) listening by the new thread for a new message on the second of the one or more secure socket connections; and (iii) receiving the incoming message on the first of the one or more secure socket connections, wherein multiple messages are downloaded simultaneously in near real-time for presentation to the customer.

22. The method according to claim 20, wherein the method further comprises:

invoking the client application service associated with the notification alert when the customer selects the notification alert presented at the client workstation.

23. The method according to claim 20, wherein the method further comprises:

prioritizing the notification alerts according to a severity of the notification data before the step of presenting at the client workstation, wherein the notification alerts are presented to the customer in order of priority.

* * * * *